(12) United States Patent
Yebka et al.

(10) Patent No.: US 12,519,107 B2
(45) Date of Patent: Jan. 6, 2026

(54) LITHIUM-ION CELL

(71) Applicant: LENOVO (SINGAPORE) PTE. LTD., Singapore (SG)

(72) Inventors: Bouziane Yebka, Morrisville, NC (US); Tin-Lup Wong, Morrisville, NC (US); Philip J Jakes, Morrisville, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 591 days.

(21) Appl. No.: 17/965,397

(22) Filed: Oct. 13, 2022

(65) Prior Publication Data
US 2024/0128453 A1 Apr. 18, 2024

(51) Int. Cl.
*H01M 4/583* (2010.01)
*H01M 4/04* (2006.01)
*H01M 4/38* (2006.01)
*H01M 4/62* (2006.01)
*H01M 10/0525* (2010.01)

(52) U.S. Cl.
CPC ......... *H01M 4/583* (2013.01); *H01M 4/0402* (2013.01); *H01M 4/386* (2013.01); *H01M 4/623* (2013.01); *H01M 4/625* (2013.01); *H01M 10/0525* (2013.01)

(58) Field of Classification Search
None
See application file for complete search history.

(56) References Cited

U.S. PATENT DOCUMENTS

| | | | | |
|---|---|---|---|---|
| 12,183,915 B2* | 12/2024 | Chen | ...................... | H01M 4/366 |
| 2015/0072230 A1 | 3/2015 | Yebka et al. | | |
| 2020/0274161 A1* | 8/2020 | Michot | ............... | H01M 4/1397 |
| 2021/0367229 A1* | 11/2021 | Lu | .......................... | H01M 4/625 |
| 2022/0320508 A1* | 10/2022 | Wang | .................... | H01M 4/386 |
| 2024/0021833 A1* | 1/2024 | He | .......................... | H01M 4/364 |
| 2024/0128461 A1* | 4/2024 | Kakiage | ................. | H01M 4/663 |
| 2024/0194881 A1* | 6/2024 | Nakayama | ........ | H01M 10/0525 |
| 2024/0421310 A1* | 12/2024 | Miwata | ............. | H01M 10/0525 |

OTHER PUBLICATIONS

Li et al., Three-Dimensional Thermal Modeling of Internal Shorting Process in a 20Ah Lithium-Ion Polymer Battery, Feb. 2020, Energies 13(4):1013 (16 pages).
PhD Dissertation, Li, Fang, Study of Stress Measurement Using Polariscope, Georgia Institute of Technology, Aug. 2010 (150 pages).

(Continued)

*Primary Examiner* — Scott J. Chmielecki
(74) *Attorney, Agent, or Firm* — Brian J. Pangrle

(57) ABSTRACT

A method can include providing a first pre-mix that includes a first population of solid particles of a first material for lithiation in an electrode of a lithium-ion cell and a second population of solid particles for a second material for lithiation in the electrode of the lithium-ion cell; providing a second pre-mix that includes a population of solid particles of the first material for lithiation in the electrode of the lithium-ion cell; forming the electrode by coating a substrate using the first pre-mix and the second pre-mix to form a coated substrate with a desired distribution of the second material in the electrode; and forming the lithium-ion cell using the electrode.

20 Claims, 18 Drawing Sheets

(56) References Cited

OTHER PUBLICATIONS

Yang et al., Transparent lithium-ion batteries, Proceedings of the National Academy of Sciences, 108(32):13013-8, Aug. 2011 (7 pages).
By Bryntesen et al., Opportunities for the State-of-the-Art Production of LIB Electrodes—A Review. Energies 2021, 14, 1406 (42 pages).
Allied Vision, White Paper, Short-wave infrared (SWIR) cameras offer versatile application fields in machine vision, V1.2, Jan. 2021 (6 pages).
Wolf, Stephen Frederic, Analytical Methods for the Determination of U in Geological and Environmental Materials, Chapter in Reviews in Mineralogy and Geochemistry, Jan. 1999 (31 pages).

\* cited by examiner

700

| Anode Material | Specific Capacity (mAh/g) | Volume Change |
|---|---|---|
| Li | 3862 | |
| $LiC_6$ | 372 | 10% |
| $Li_{13}Sn_5$ | 990 | 252% |
| $Li_9Al_4$ | 2235 | 604% |
| $Li_{15}Si_4$ | 3600 | 320% |

| Constituents | Contents (wt. %) | | Content (g) |
|---|---|---|---|
| | Dried Mixture | Wet Slurry | Slurry B |
| Active powder (Graphite) | 47 (%) | 25.38 (%) | 5.08 g |
| Silicon oxide (10%) | 47 (%) | 25.38 (%) | 5.08 g |
| Conductive Carbon additives | 1.00 (%) | 0.54 (%) | 0.4 g |
| Binder (PVDF) | 5.00 (%) | 2.70 (%) | 0.55 g |
| Solvent (NMP) | - | 46.00 (%) | 10 g |
| Solid content | - | 54.00 (%) | - |
| Total | 100 (%) | 100 (%) | 21.11 g |

920

| Constituents | Contents (wt. %) | | Content (g) |
|---|---|---|---|
| | Dried Mixture | Wet Slurry | Slurry A |
| Active powder (Graphite) | 94 (%) | 50.76 (%) | 497.44 g |
| Conductive Carbon additives | 1.00 (%) | 0.54 (%) | 5.0 g |
| Binder (PVDF) | 5.00 (%) | 2.70 (%) | 26.45 g |
| Solvent (NMP) | - | 46.00 (%) | 450 g |
| Solid content | - | 54.00 (%) | |
| Total | 100 (%) | 100 (%) | 973.81 g |

| Constituents | Contents (wt. %) | | Content (g) |
|---|---|---|---|
| | Dried Mixture | Wet Slurry | Slurry B |
| Active powder (Graphite) | 47 (%) | 25.38 (%) | 50.8 g |
| Silicon oxide (10%) | 47 (%) | 25.38 (%) | 50.8 g |
| Conductive Carbon additives | 1.00 (%) | 0.54 (%) | 1.08 g |
| Binder (PVDF) | 5.00 (%) | 2.70 (%) | 5.4 g |
| Solvent (NMP) | - | 46.00 (%) | 92 g |
| Solid content | - | 54.00 (%) | - |
| Total | 100 (%) | 100 (%) | 200.08 g |

1020

| Constituents | Contents (wt. %) | | Content (g) |
|---|---|---|---|
| | Dried Mixture | Wet Slurry | Slurry A |
| Active powder (Graphite) | 94 (%) | 50.76 (%) | 406 g |
| Conductive Carbon additives | 1.00 (%) | 0.54 (%) | 4.32 g |
| Binder (PVDF) | 5.00 (%) | 2.70 (%) | 21.6 g |
| Solvent (NMP) | - | 46.00 (%) | 368 g |
| Solid content | - | 54.00 (%) | |
| Total | 100 (%) | 100 (%) | 799.92 g |

FIG. 10

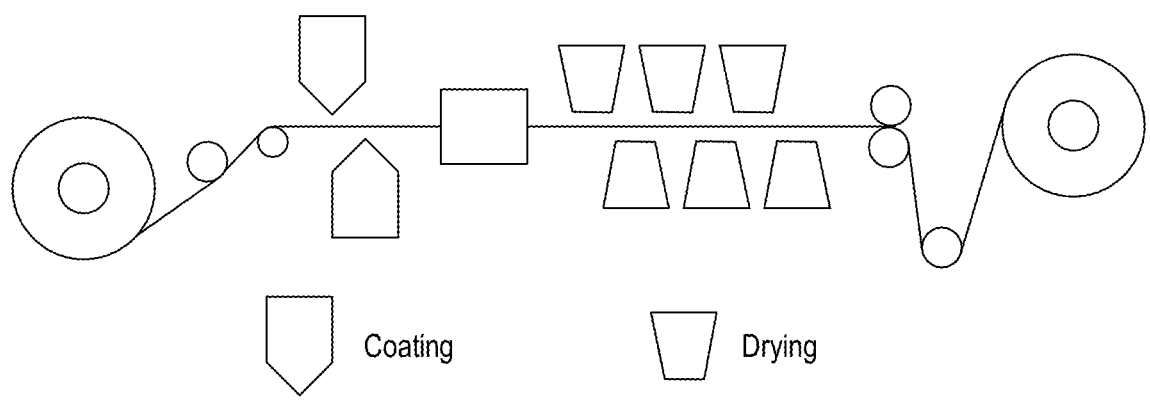
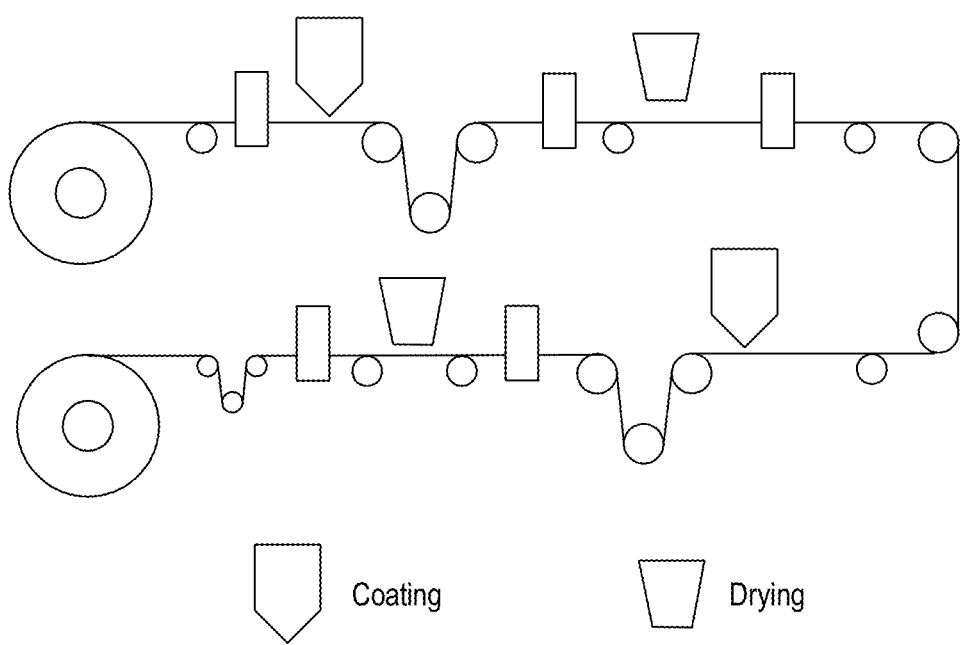
FIG. 13

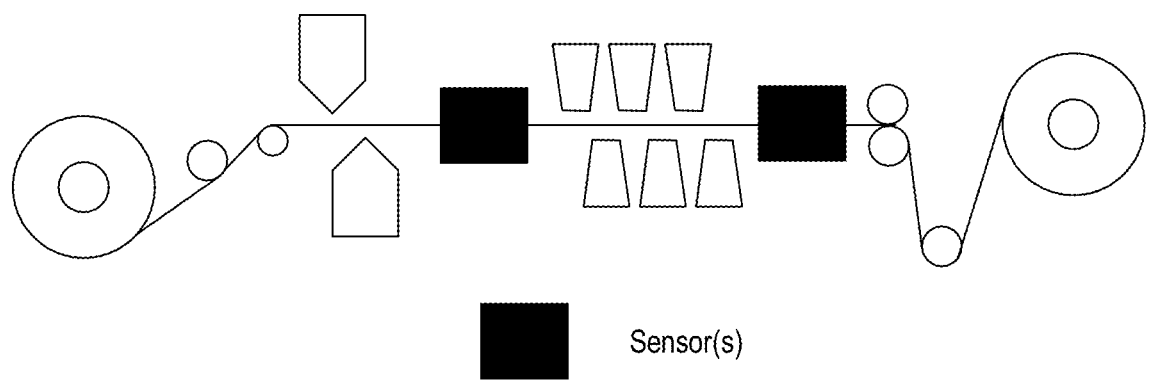
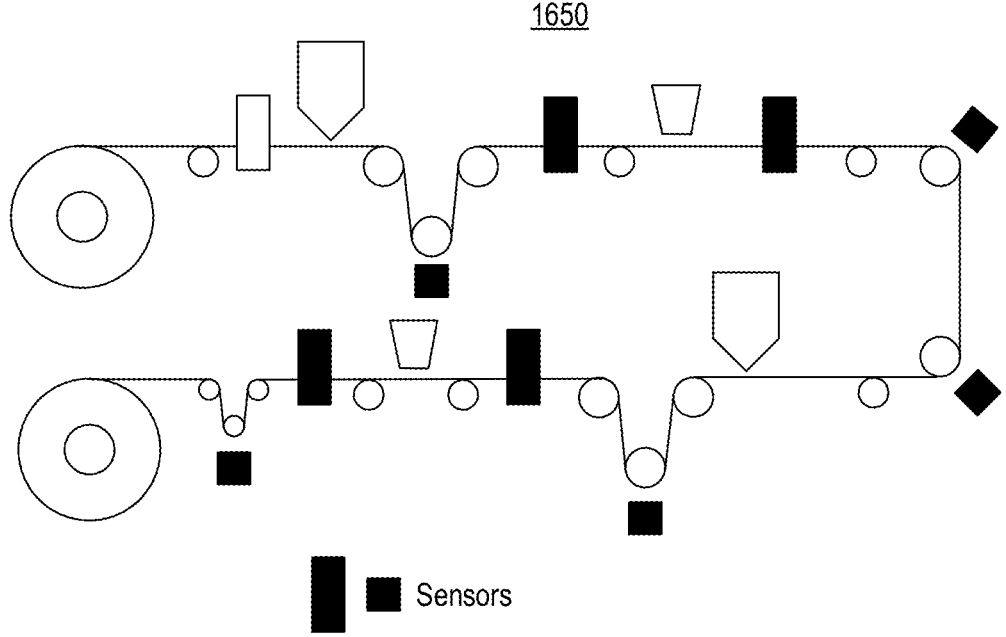
FIG. 16

1700

---

Distribution
(e.g., via chemistry and/or imagery)
1710

---

Thermal Stresses
(e.g., via imagery)
1720

---

Lithiation Stresses
(e.g., model-based using distribution)
1730

---

Internal Stresses
(e.g., model-based, imagery, etc.)
1740

FIG. 17

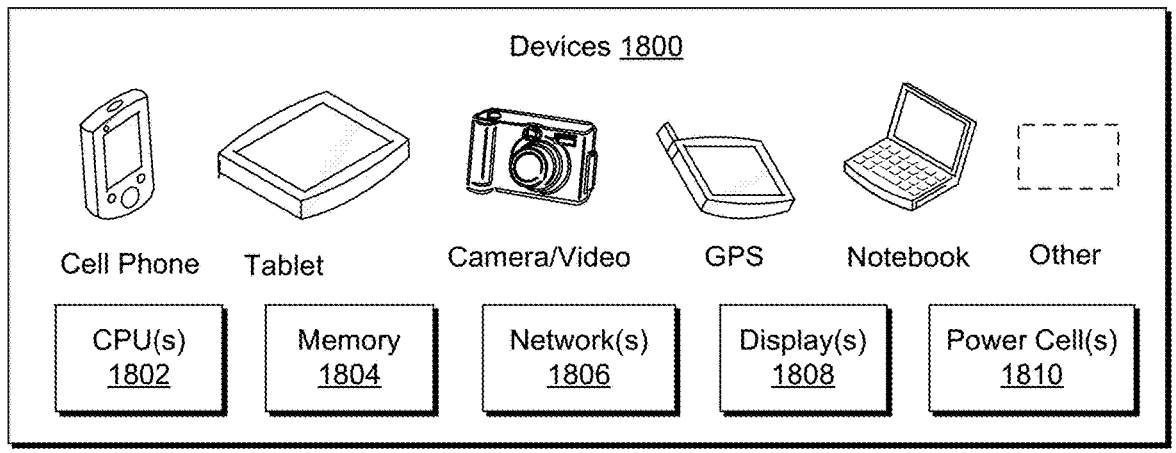
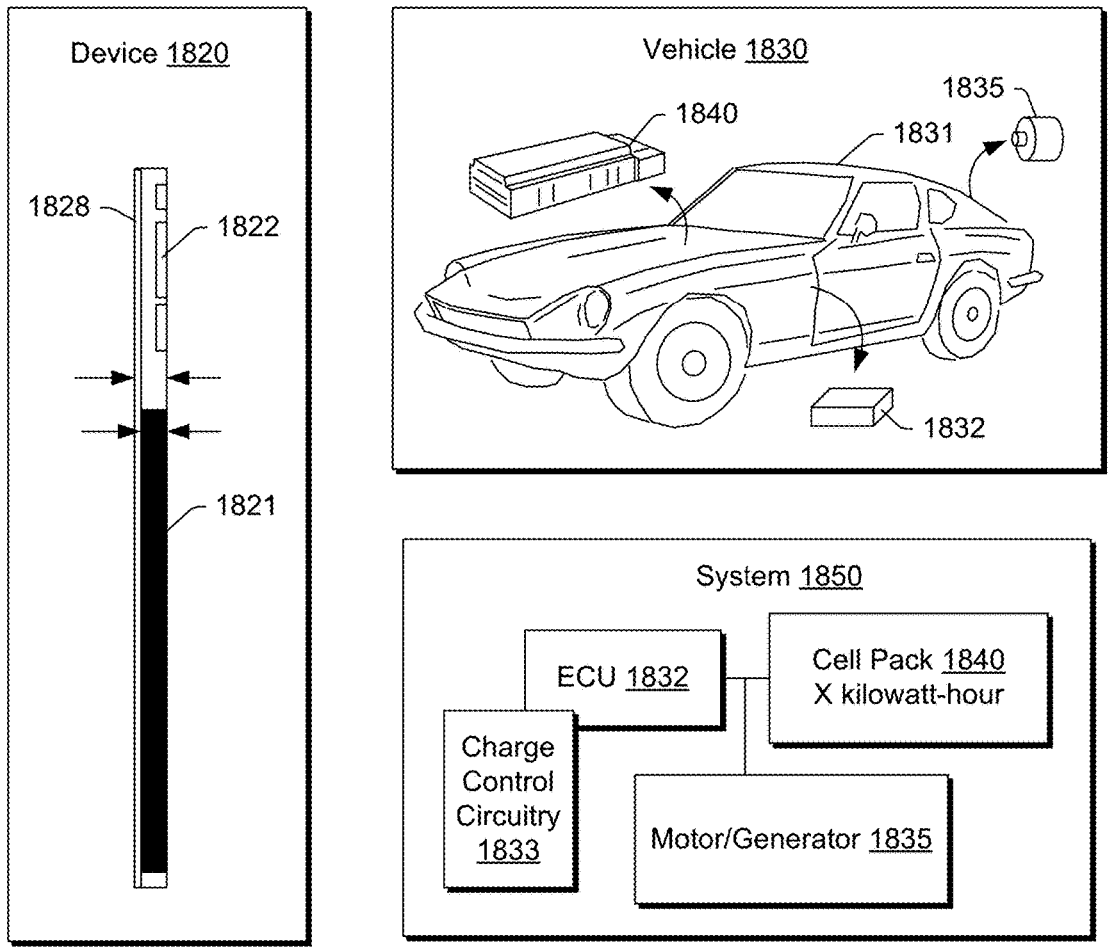
FIG. 18

LITHIUM-ION CELL

TECHNICAL FIELD

Subject matter disclosed herein generally relates to lithium-ion cell technologies.

BACKGROUND

Electrochemical cells include, for example, lithium-ion cells. Such cells may be characterized, for example, as to specific energy (e.g., Wh/kg or MJ/kg), energy density (Wh/l or MJ/l), specific power (W/kg), etc. Various technologies and techniques described herein pertain to electrochemical cells, for example, including lithium-ion cells.

SUMMARY

A method can include providing a first pre-mix that includes a first population of solid particles of a first material for lithiation in an electrode of a lithium-ion cell and a second population of solid particles for a second material for lithiation in the electrode of the lithium-ion cell; providing a second pre-mix that includes a population of solid particles of the first material for lithiation in the electrode of the lithium-ion cell; forming the electrode by coating a substrate using the first pre-mix and the second pre-mix to form a coated substrate with a desired distribution of the second material in the electrode; and forming the lithium-ion cell using the electrode. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

FIG. 7 is an example of a table;
FIG. 9 is an example of tables for pre-mixes;
FIG. 10 is an example of tables for pre-mixes;
FIG. 13 is a diagram of examples of processing equipment;
FIG. 16 is a diagram of examples of processing equipment;
FIG. 17 is a diagram of examples of techniques;
and
FIG. 18 is a diagram of examples of devices.

DETAILED DESCRIPTION

The following description includes the best mode presently contemplated for practicing the described implementations. This description is not to be taken in a limiting sense, but rather is made merely for the purpose of describing general principles of various implementations. The scope of invention should be ascertained with reference to issued claims.

Figure 1:
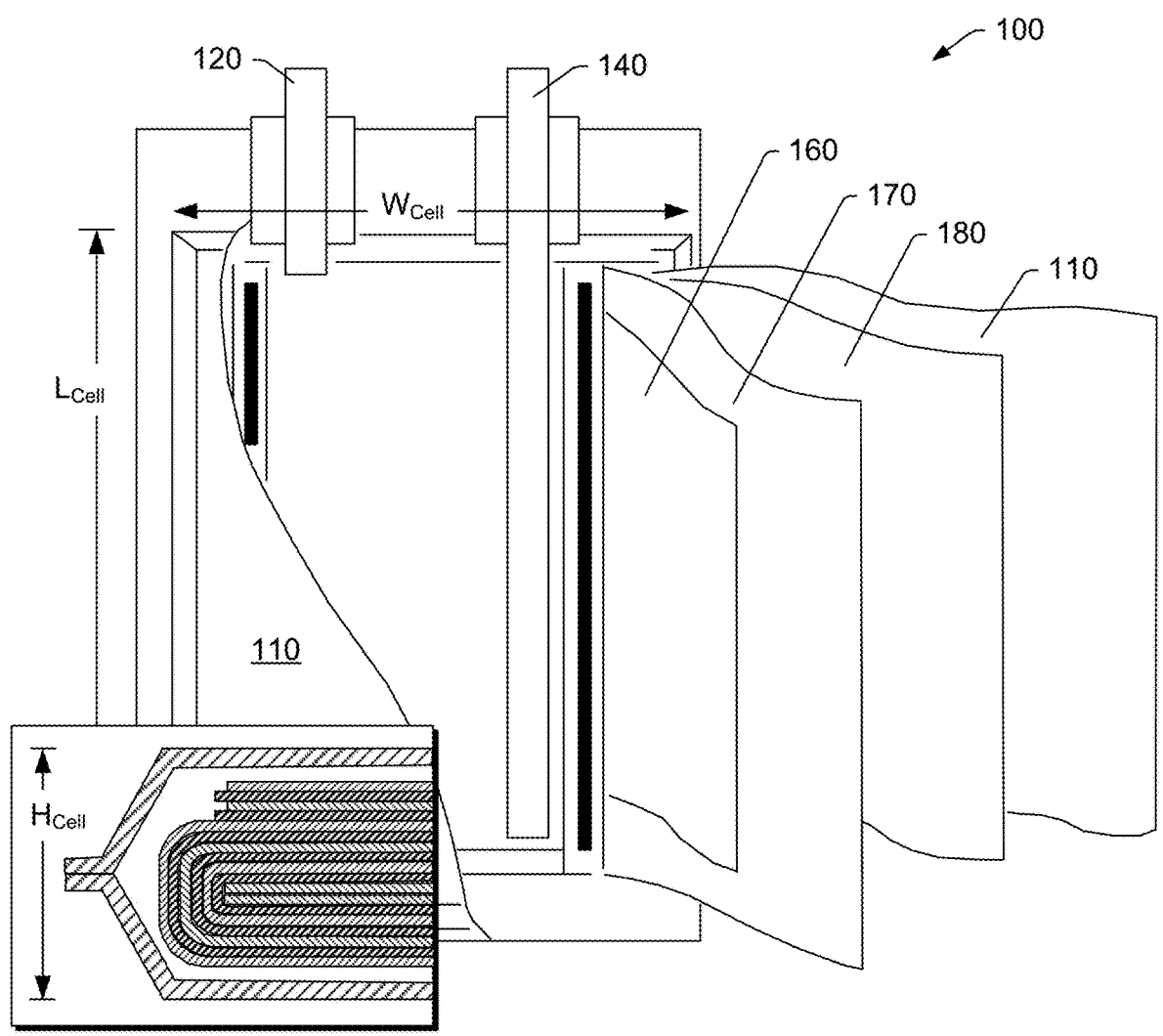
FIG. 1 is a diagram of an example of a battery.

FIG. 1 shows an approximate cut-away view of an example of a battery 100 that includes a casing 110 and a positive tab 120 and a negative tab 140, for example, to operatively couple the battery 100 to circuitry. The casing 110 may include a cell region defined by a cell length ($L_{Cell}$), a cell width ($W_{Cell}$) and a cell height ($H_{Cell}$). As an example, the cell region may include one or more electrochemical cells. As an example, an electrochemical cell may be formed in part by a cathode 160, a separator 170 and an anode 180. Such components may be "folded", for example, to form a stack (e.g., "jelly roll") that may be housed in the cell region of the casing 110. As shown in the example of FIG. 1, in an approximate cross-sectional view, the height ($H_{Cell}$) of the cell region of the casing 110 may be defined in part by thicknesses of the cathode 160, the separator 170 and the anode 180 as well as, for example, by stacking of such components (e.g., winding in a roll or other configuration). As an example, a cathode formed of electrode material, an anode formed of electrode material and a separator formed of separator material along with collector materials may be layered and stacked, for example, by folding in a zigzag orientation, folding in a clockwise roll orientation, folding in a counterclockwise roll orientation, etc.

As an example, a region of a battery with one or more cells may include $L_{Cell}$ and $W_{Cell}$ dimensions (e.g., rectangular dimensions), for example, with a $L_{Cell}/W_{Cell}$ ratio in a range of about 1 to about 5. As an example, consider a cell (or cells) with dimensions of about 120 mm ($L_{Cell}$) by about 100 mm ($W_{Cell}$) where, in combination with a height ($H_{Cell}$), a volume ($Vol_{Cell}$) may be calculated.

Figure 2:
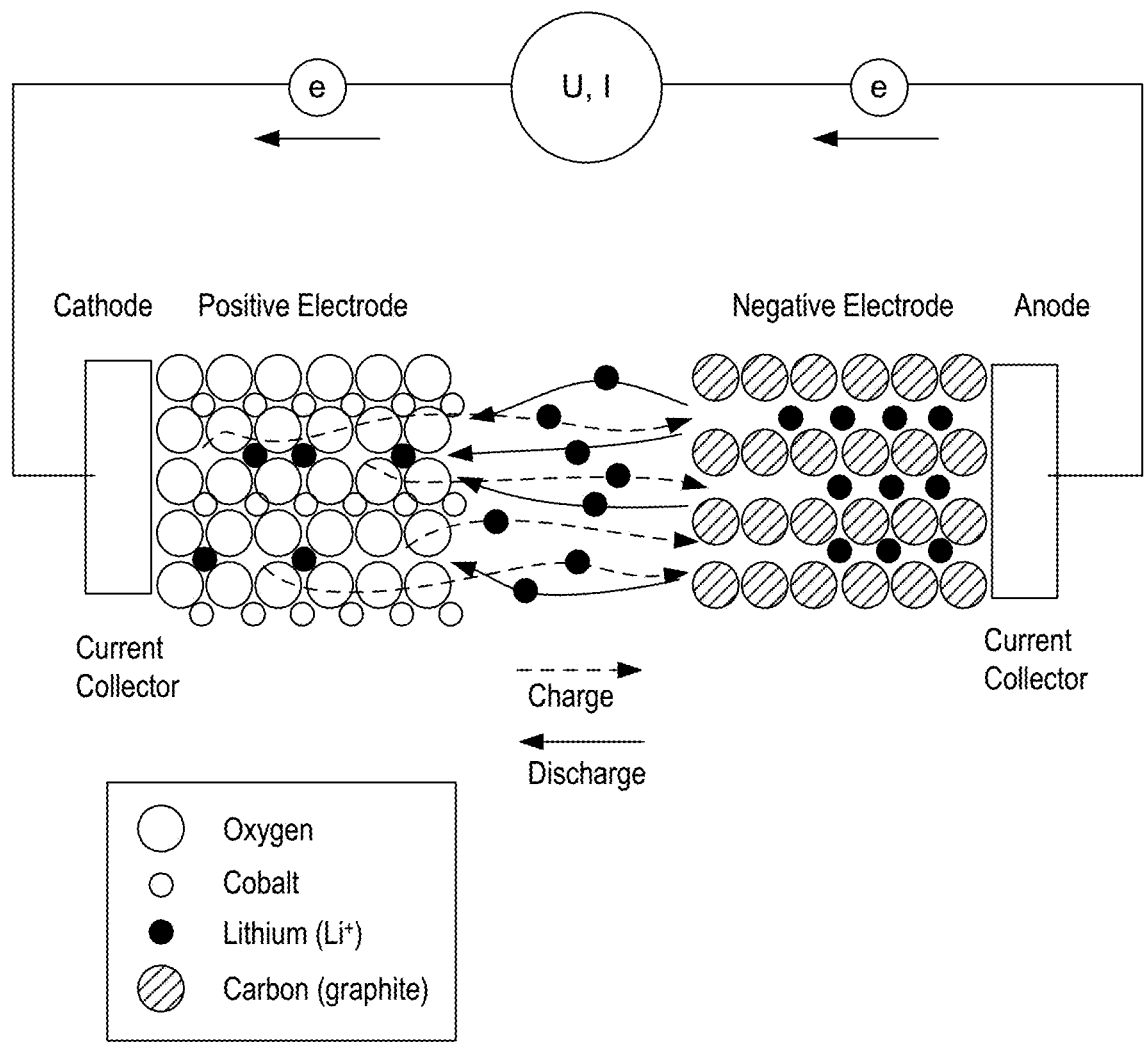
FIG. 2 is a diagram of an example of a lithium-ion cell.

FIG. 2 shows a diagram of an example of a battery 210 and a table 220 that includes some examples of parameters for cathode materials (e.g., cathode electrode materials). In the example of FIG. 2, the battery 210 includes a cathode, an anode, a cathode current collector, an anode current collector, a positive electrode that includes oxygen and cobalt and a negative electrode that includes carbon (e.g., graphite, etc.). During charging, lithium ions (Li$^+$) can pass from the positive electrode to the negative electrode and, during discharging, lithium ions (Li$^+$) can pass from the negative electrode to the positive electrode. The table 220 shows some values for diffusion coefficients of lithium ions in various types of cathode materials that can function as positive electrodes (e.g., positive electrode materials or cathode materials) as well as some values for electrical conductivity of those various types of cathode materials.

In FIG. 2, the diffusion coefficient values are given in units of cm$^2$s$^{-1}$ while the electrical conductivity values are given in units of Scm$^{-1}$. Diffusion may be described, for example, using one or more of Fick's laws. As to Fick's second law, it can be utilized to predict how diffusion can cause concentration to change with respect to time. In one dimension, consider the following partial differential equation:

$$\frac{\partial \varphi}{\partial t} = D \frac{\partial^2 \varphi}{\partial x^2}$$

where φ is the concentration in dimensions of amount of substance per unit volume, which is dependent on time, where x is a position (e.g., length) and where D is the diffusion coefficient in units of length squared with respect to time (in two or more dimensions, the Laplacian may be utilized, as appropriate to generalize the second derivative).

According to Fick's second law, concentration and diffusion coefficient can impact diffusion where, for a given concentration, a smaller diffusion coefficient means a lesser change in concentration with respect to time. As can be seen in the table 220 of FIG. 2, the diffusion coefficients tend to be low and characteristic of solid materials (e.g., chemicals diffusing into or out of a solid matrix). For comparison, consider a volatile chemical diffusing in air where a diffusion coefficient may be of the order of about 0.1 $cm^2s^{-1}$. Diffusion can play a role in behavior of a lithium ion battery, for example, discharge rate (e.g., diffusion of lithium ions into a cathode material) can depend on the chemical and/or physical structure of the cathode material of the lithium ion battery.

Diffusion can depend on temperature. For example, a diffusion coefficient for lithium ions can increase with temperature where, for example, at 50 degrees C., diffusion coefficient can be greater than that at 25 degrees C. Further, a diffusion coefficient for lithium ions at a relatively low temperature (e.g., 0 degrees C.) tends to be less than that at 25 degrees C.

During operation, heat can be generated responsive to current. Current transfer inside a lithium-ion battery (LIB) is driven by the potential gradient. In an article by Li et al., Three-Dimensional Thermal Modeling of Internal Shorting Process in a 20 Ah Lithium-Ion Polymer Battery, February 2020, Energies 13(4):1013, which is incorporated by reference herein, modeling results indicate for a particular LIB that current flow comes from a tab, goes into the whole cell, and goes back to a tab under normal discharging condition. Such current flow patterns can be utilized to model and characterize heat generation, dissipation and temperatures in LIBs. The article by Li et al., demonstrates that, under an internal shorting situation, current concentrates towards an internal short where, as the shorting resistance can be small, a large current can go through the internal short in an internal shorting process where the large current can then cause a sudden generation of heat, which may result in a detrimental thermal runaway. Thermal diffusion can be a factor in LIB operation as an inability to dissipate generated heat may lead to unstable operation (e.g., undesirable reactions), thermal stresses, etc.

As explained, a LIB can depend on diffusion of lithium ions where such diffusion can depend on temperature. And, temperature may be uneven within a LIB due to one or more factors, which can include current related factors, environmental factors, casing factors, etc. A LIB may benefit from a distribution of materials that can account for various factors such that, for example, spatial patterns of current, temperature and diffusion reduce risk of one or more performance issues (e.g., thermal hotspots, thermal runaway, thermal stresses, etc.) and/or improve performance.

Figure 3:
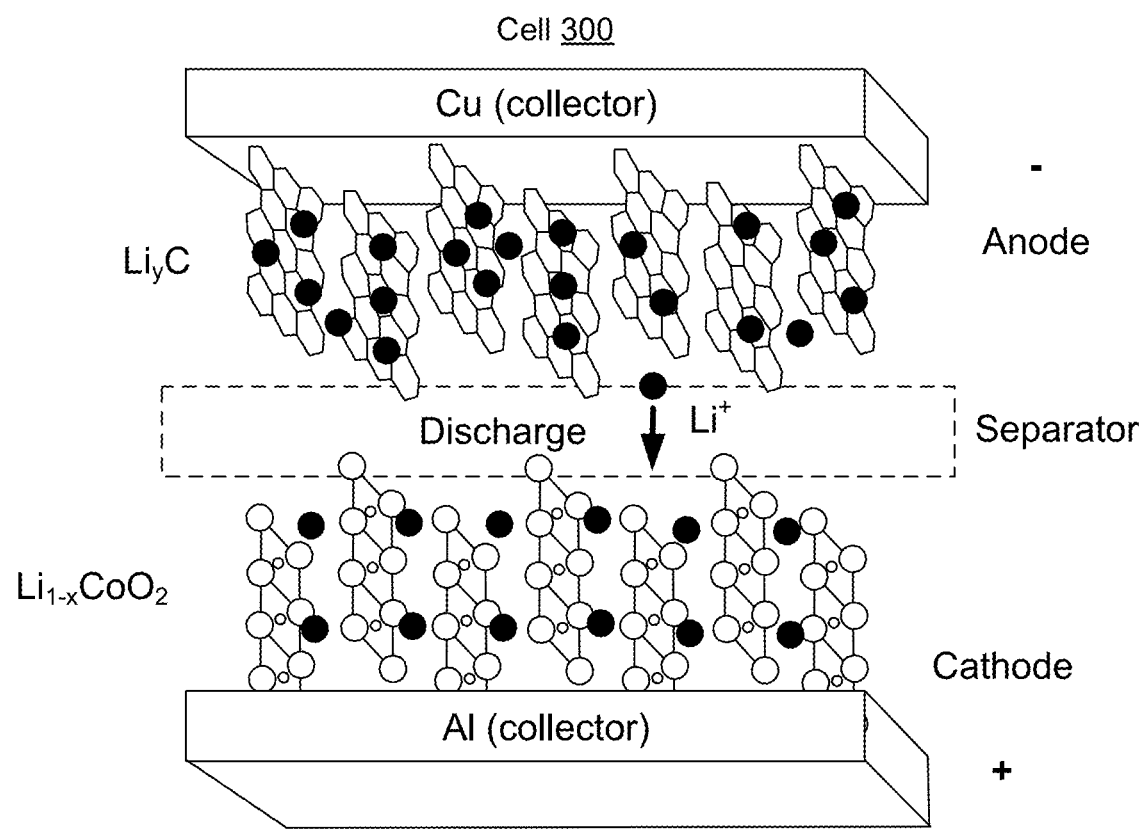
FIG. 3 is a diagram of an example of a lithium-ion cell where an anode electrode includes graphite.

FIG. 3 shows an example of a cell 300, which may be utilized alone or to form a stack of cells. As shown, the cell 300 includes an anode collector material that includes, for example, copper; an anode electrode material that includes lithium and carbon (e.g., $Li_yC$); a separator material configured for passage of lithium ions (e.g., in electrolyte); a cathode electrode material that includes lithium and metal oxide (e.g., $Li_{1-x}CoO_2$); and a cathode collector material that includes, for example, aluminum. While carbon, cobalt, copper and aluminum are mentioned, other materials may be employed to form a lithium-ion cell.

As to the terms "anode" and "cathode", these may be defined based on discharge, for example, where lithium ions migrate in a direction shown in FIG. 3 from a carbon-based matrix towards a metal oxide-based matrix. In other words, when a lithium-ion based cell is discharging, a positively charged lithium ion may be extracted from anode electrode material (e.g., a graphite lattice) and inserted into cathode electrode material (e.g., into a lithium containing compound); whereas, when such a cell is charging, the reverse process may occur (see, e.g., FIG. 2).

As an example, positive electrode material (e.g., cathode electrode material) may include $LiCoO_2$, $LiMn_2O_4$ or other compound (see, e.g., the table 220 of FIG. 2). As an example, separator material may include a conducting polymer electrolyte (e.g. polyethyleneoxide (PEO), etc.). For example, a separator material may include polymer that provides for conduction of lithium ions (e.g., a lithium-ion conductive polymer material). As an example, negative electrode material (e.g., anode electrode material) may include ionizable lithium metal, a carbon-lithium intercalation compound, etc.

As an example, a lithium-ion battery may include one or more cells where each cell includes an anode, a cathode and electrolyte, which may be a polymeric material or provided in a polymeric matrix. As an example, a cell may include an anode electrode material that includes carbon, a cathode electrode material that includes a metal oxide, and a separator material that includes polymer.

As an example, active electrode particles may be used for a cathode to form cathode electrode material. For example, consider particles that include one or more of lithium cobalt oxide ($LiCoO_2$) (LCO), lithium nickel oxide ($LiNiO_2$), lithium manganese oxide ($LiMn_2O_4$), and lithium iron phosphate ($LiFePO_4$).

As an example, positive active electrode particles may include lithium and metal oxide, for example, represented by $Li_xM^1{}_yM^2{}_{1-y}O_2$ where $0.4 \leq x \leq 1$; $0.3 \leq y \leq 1$; $M^1$ is at least one selected from the group consisting of Ni and Mn; and $M^2$ is at least one selected from the group consisting of Co, Al, and Fe. As an example, positive active electrode particles may include lithium and metal oxide, for example, be represented by one of the following: $LiNi_xCo_yAl_zO_2$, where $0.7 \leq x \leq 1$; $0 \leq y \leq 0.3$; $0 \leq z \leq 0.03$; and $0.9 \leq x+y+z \leq 1.1$; $LiNi_xCo_yMn_zO_2$ (NMC), where $0.3 \leq x \leq 0.6$; $0 \leq y \leq 0.4$; $0.3 \leq z \leq 0.6$; and $0.9 \leq x+y+z \leq 1.1$; $Li_xMn_2O_2$, where $0.4 \leq x \leq 0.6$; and $0.9 \leq z \leq 1$; or $LiFe_xCo_yMn_zO_2$, where $0.3 \leq x \leq 0.6$; $0.1 \leq y \leq 0.4$; $0.3 \leq z \leq 0.6$; and $0.9 \leq x+y+z \leq 1.1$. As an example, lithium iron phosphate ($LiFePO_4$) (LFP) may be utilized as an electrode material.

As an example, active electrode particles may be used for an anode to form anode electrode material. For example, consider particles that include one or more of carbon lithium and lithium titanate. As to lithium titanate, consider, for example: $Li_2TiO_3$; $Li_4TiO_{12}$; $Li_4Ti_5O_{12}$.

As an example, a cell may include electrolyte in a polymeric matrix. For example, consider an electrolyte that includes $Li(ClO_4)_2$ in polycarbonate/tetrahydrofuran (PC/THF) (e.g., about 0.4 M) or other polymeric matrix.

As an example, a cell can include a polymer composite material such as polyethylene oxide (PEO), polyacrylonitrile, etc. that includes lithium salt. Such a cell or cells may be referred to as a lithium-ion battery or a lithium-ion polymer battery or a lithium-polymer battery (e.g., "LiPo battery" or "LiPo cell"). LiPo cells are sometimes referred to as laminate cells, which may be configured very thin or quite large depending on their intended use. One or more LiPo cells may be encased in a flexible aluminum foil laminate pouch (e.g., with a thickness of the order of about 0.1 mm; see, e.g., the casing 110 of the battery 100 of FIG. 1). LiPo cells may include a stacked construction formed by stacking materials that include electrode and electrolyte materials in a flat sandwich (e.g., defined by length, width and height dimensions). Stacked layers may be packed in a package (see, e.g., the casing 110 of FIG. 1) in a flat, rolled or other configuration. LiPo cell capacities may include capacities in a range, for example of about 50 mA·hrs (e.g., for a small cell such as for a BLUETOOTH headset) to about 10 A·hrs or more for an electric vehicle (e.g., electric or hybrid).

As explained, in a lithium-ion cell, lithium ions can move from a negative electrode (e.g., anode) to a positive electrode (e.g., cathode) during discharge and reversely when being charged. As an example, a LiPo cell can include a polyethylene (PE), a polypropylene (PP), a PP/PE, or other material as a separator material. Some LiPo cells may include a polymer gel containing an electrolyte solution, which may be, for example, coated onto an electrode surface (e.g., as a separator material layer). As an example, a continuous layer of material may be provided that carries various materials where the continuous material may be folded to form a stack of materials. As an example, the continuous layer of material may be a separator material in that portions of it are disposed between layers of electrode materials (e.g., to separator anode electrode material from cathode electrode material).

Figure 4:
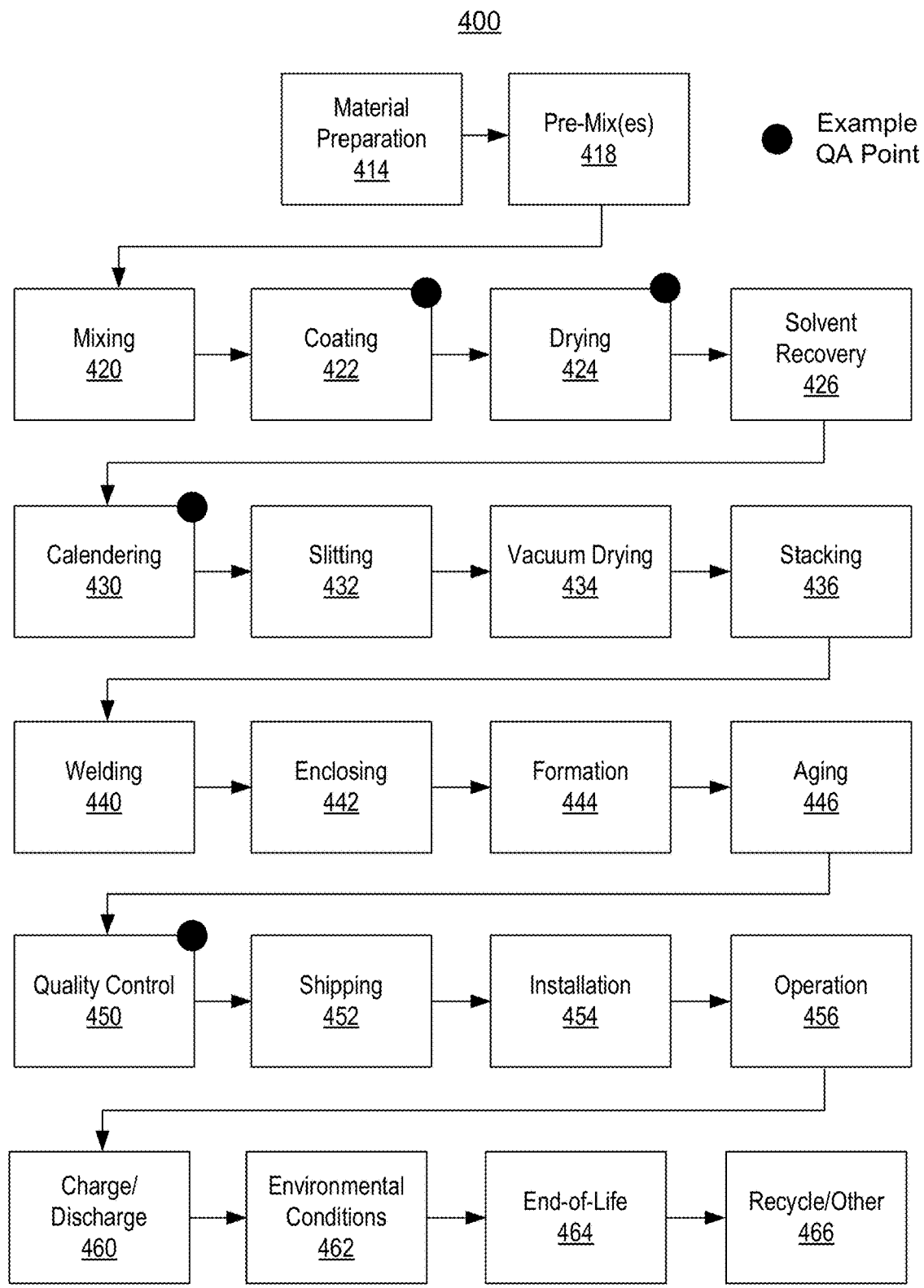
FIG. 4 is a diagram of an example of a workflow.

FIG. 4 shows an example of a workflow 400 for lithium-ion batteries (LIBs). As shown, the workflow 400 can include material preparation 414, providing one or more pre-mixes 418, mixing 420, coating 422, drying 424, solvent recovery 426, calendaring 430, slitting 432, vacuum drying 434, stacking 436 (e.g., or winding), welding 440, enclosing 442, formation 444, aging 446, quality control 450 (e.g., prior to packaging for shipping, etc.), shipping 452, installation 454, operation 456, charge/discharge cycling 460, exposure to environmental conditions 462, end-of-life 464 and recycling and/or other processing 466.

An article by Bryntesen et al., Opportunities for the State-of-the-Art Production of LIB Electrodes—A Review. Energies 2021, 14, 1406, is incorporated by reference herein. The Brynstesen et al. article describes electrode production via slurry mixing, coating and drying.

Alternative techniques to wet slurry casting and drying can include electron beam curing, spray-painting, 3D printing, pulse-laser deposition, spray-drying, freeze-casting/freeze-drying, dry pressing, and electrostatic spray deposition. As an example, one or more methods, techniques, systems, etc., may be applied to one or more of slurry and/or one or more of such alternative techniques. As an example, a process may utilize multiple techniques.

As an example, material preparation, forming a pre-mix and/or mixing can involve one or more slurries, powders and/or other forms of materials. A slurry may be defined as a mixture of a liquid and solid particles that retain some fluidity. A slurry may include various materials such as, for example, a binder, an active material (e.g., NMC, LCO, LFP, etc., in cathodes and, e.g., graphite, etc., in anodes), a conductive additive (e.g., carbon black, etc.), and a solvent (e.g., N-methyl-2-pyrrolidone (NMP), water, etc.). A powder may be a mix of particles that can be characterized according to size, shape, population statistics, densities, etc.

As to coating (see, e.g., coating 422), one or more techniques may be utilized. For example, consider deposition via a jet or jets. As an example, a jet or jets may be stationary or movable where, for example, movement may be controlled by a controller that may be part of a process controller for at least a portion of a workflow such as a portion of the workflow 400 of FIG. 4. As an example, a jet or jets may be suitable for depositing liquid, solids and/or a slurry (e.g., a combination of solids in liquid).

As an example, a slot-die coater can include one or more jets. As an example, a slot-die coater can include one or more fluid reservoirs, a pump to drive coating fluid through the system, a slot-die to distribute the coating fluid across a desired coating width before coating onto a substrate, a substrate mounting system to support the substrate in a controlled manner and a coating motion system to drive the relative speed of the slot-die and substrate in a controlled manner during coating. As an example, a slot-die coater may operate at a speed rated in meters per minute (e.g., consider 25 meters per minute), provide a coating thickness accuracy of approximately one micron, provide a coating thickness in a range from approximately 2 microns to approximately 100 microns and provide a coating width of approximately 1500 mm. As an example, one or more methods, systems, etc., may utilize one or more slot-die coaters, optionally in combination with one or more other types of coating equipment. For example, consider a slot-die coater that can provide a first coat where another jet or jets can provide one or more additional coats, which may, for example, aim to provide a desired distribution of one or more materials in an electrode material.

As an example, a slurry may be coated onto a current collector such as, for example, aluminum (Al) for a cathode and copper (Cu) for an anode. As an example, solvent may be evaporated through drying where a dried coated layer is calendered and/or compressed down to a specific thickness or density followed by cutting of the layer into a desired shape for assembling electrodes into cells of a particular geometrical shape. As an example, electrolyte may be provided for filling a cell or cells, which may occur in a dry room with controlled humidity.

As explained, one or more pre-mixes may be formulated and provided in a LIB workflow. In such an approach, making, handling, processing, etc., of one or more pre-mixes can enhance an ability to control the distribution of one or more materials in an electrode or electrodes of a LIB, which can thereby improve LIB performance over time.

In various instances, an electrode may be formulated to include more than one solid material. For example, consider an anode that is formulated with graphite as a first solid material and with silicon as a second solid material. In such an example, the second solid material may be present at a level that is less than a level of the first material. In various instances, as the level of the second solid material becomes smaller with respect to the level of the first solid material, distribution of the second solid material may become less homogenous. For example, consider three parts of the first solid material to one part of the second solid material or less where it may become more difficult, for one or more reasons, to achieve a suitable distribution of the second solid material amongst the first solid material.

As to the aforementioned examples of graphite and silicon, graphite may have a density in a range of approximately 2.09 $g/cm^3$ to approximately 2.23 $g/cm^3$ while silicon may have a higher density (e.g., approximately 2.32 $g/cm^3$ for crystalline silicon (metal) and 2.65 $g/cm^3$ for silicon oxide (silicon dioxide)). In a gravity influenced environment, density differences between materials can be a cause of non-uniform distributions of the materials. Whether a LIB is small or large, undesirable maldistribution of materials in a LIB can be detrimental to performance. Some examples of relatively small LIBs have been mentioned. As to a large LIB, consider an electric vehicle that may include an LIB with more than 10 kg of graphite. As the amount of graphite increases, the overall impact of an undesirable distribution of material (e.g., silicon, etc.) in the graphite can increase. As explained, various factors can impact current, temperature and diffusion during operation of an LIB. One of such factors can be, for an anode electrode material, the distribution of silicon (e.g., in one or more forms) with respect to graphite.

As explained, a desired distribution of material may be difficult to achieve due to one or more factors. An existing slurry mixing process for an LIB that utilizes a single powder composition for an electrode can prove ineffective to achieve uniform slurry dispersion when adding relatively low percentages of one or more heavy elements, silicon and/or one or more other materials. As to silicon oxide (e.g., silicon dioxide, $SiO_2$), it may have a density of approximately 2.648 $g/cm^3$ in an $\alpha$-quartz form, which is greater than the aforementioned density of graphite; noting that, in an amorphous form, the density of silicon oxide can be less (e.g., 2.196 $g/cm^3$). While silicon and silicon oxide are mentioned, one or more other materials may be desirable in electrode formation of an LIB electrode (e.g., consider cobalt in a cathode electrode material, etc.).

As an example, a method can include preparing or otherwise providing one or more pre-mixes that improve an ability to make a LIB electrode or LIB electrodes with a desirable distribution of material. For example, to achieve an effective and homogenous slurry and desirable material dispersion, a method may account for various factors, which may include one or more of solid powder concentration, blending, atomic weight, mixing sequence, mixing devices, and operating conditions.

Figure 5:
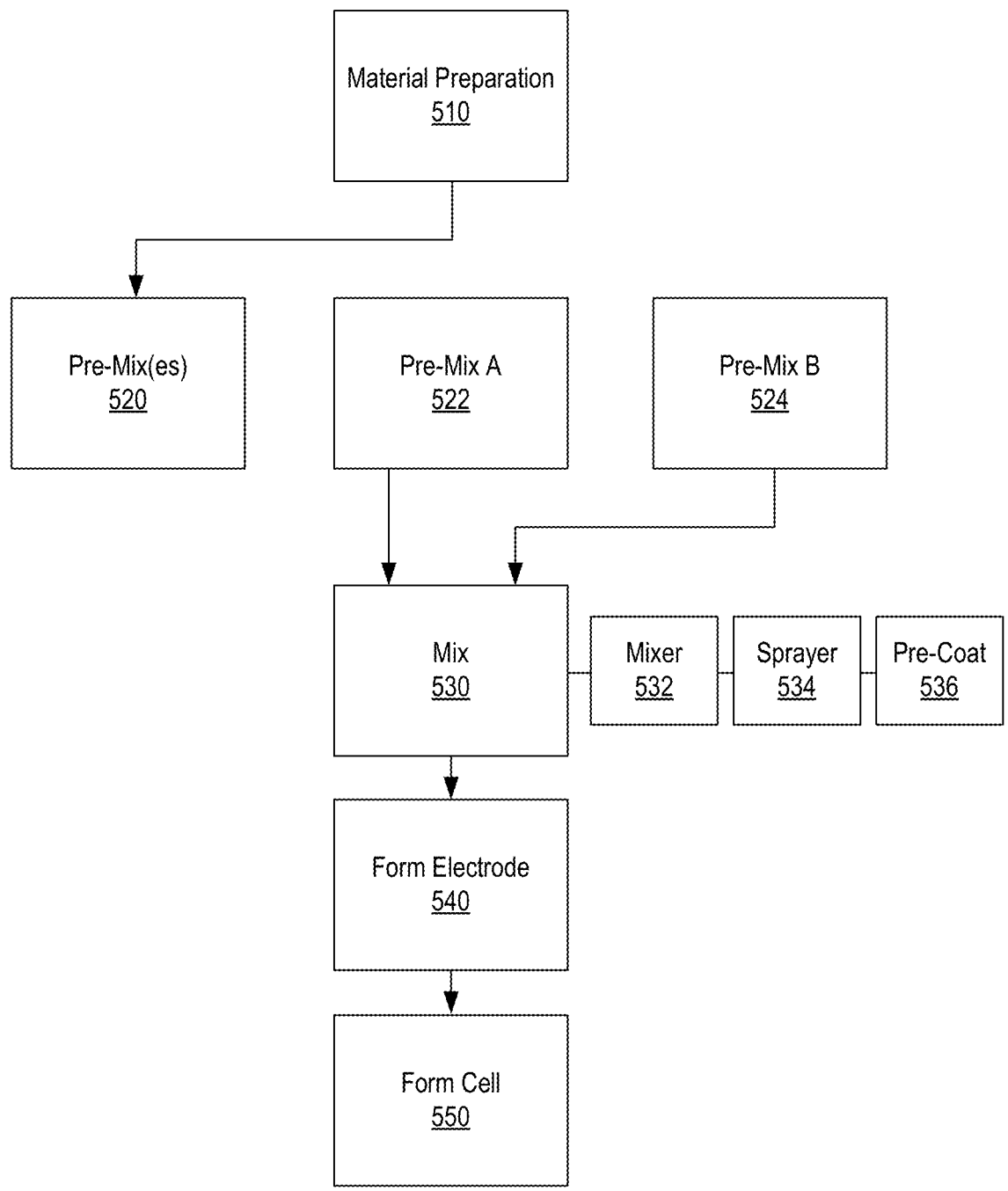
FIG. 5 is a diagram of an example of a method.

FIG. 5 shows an example of a method 500 that includes material preparation block 510 for preparing materials, a formation block 520 for forming pre-mixes, where the pre-mixes 520 can include a pre-mix A 522 and a pre-mix B 524, and a mixing block 530 for mixing the pre-mix A 522 and the pre-mix B 524 to form a mixture. As shown, the method 500 can include a formation block 540 for forming an electrode using the mixture and a formation block 550 for forming a lithium-ion cell using the electrode.

As an example, the method 500 can include providing the pre-mix A 522 as a first pre-mix (e.g., as a slurry, etc.) that includes a first population of solid particles of a first material for lithiation in an electrode of a lithium-ion cell and a second population of solid particles for a second material for lithiation in the electrode of the lithium-ion cell; providing the pre-mix B 524 as a second pre-mix (e.g., as a slurry, etc.) that includes a population of solid particles of the first material for lithiation in the electrode of the lithium-ion cell; forming the electrode per the formation block 540 by at least coating a substrate using a mixture of the first pre-mix and the second pre-mix to form a coated substrate per the mixing block 530; and, per the formation block 550, forming the lithium-ion cell using the electrode.

In the example of FIG. 5, a minority pre-mix may be utilized for achieving a desirable distribution of one of its ingredients when forming an electrode. For example, the pre-mix A 522 can provide for coating (e.g., depositing, etc.) in a manner whereby the distribution of a material therein can be controlled. In such an example, a method may aim for a uniform distribution of the material or, for example, a desirable distribution according to a pre-determined pattern, which may be favorable for one or more reasons. As explained, distribution of one material with respect to another material may have an effect on one or more of current, temperature and diffusion. As an example, distribution of one material with respect to another material may have an effect on developing and/or handling stress (e.g., internal stress, thermal stress, volumetric lithiation-related stress, etc.).

As an example, consider a slurry mixing process for silicon content in a range of approximately 0.1 percent to 99.9 mass percent with respect to graphite where a remaining percent is graphite and where silicon and graphite are provided as solid particles; noting that silicon may be in the form of silicon oxide.

In the foregoing example, consider a mass of 100 grams where 5 grams of silicon are provided with 95 grams of graphite. In such an example, the pre-mix A 522 of FIG. 5 can be formulated using the 5 grams of silicon and using 5 grams of the graphite while the pre-mix B 524 of FIG. 5 can be formulated using the remaining amount of graphite, specifically 90 grams of graphite. In such an example, a mixer or mixers can be utilized where a mixing speed for the pre-mix A 522 can be less than a mixing speed for the pre-mix B 524. After preparation of the pre-mix A 522 and the pre-mix B 524, they can be mixed using a mixer with an appropriate mixing speed, which can be lower than the mixing speed for preparation of the pre-mix B 524. In such an example, the utilization of the multiple pre-mixes, particularly the pre-mix for the silicon, can improve homogeneity of the distribution of the silicon in a mixture of silicon and graphite, which can thereby improve an ability to desirably distribute one or more materials in an electrode of a LIB (e.g., uniformly and/or another type of desirable distribution). In the example of FIG. 5, a 100 gram mixture of silicon and graphite can be formed with 5 grams of silicon and 95 grams of graphite. While the foregoing example refers to uniformity of materials in prepared materials (e.g., pre-mixes), as mentioned, a desirable distribution may be according to a pattern, which may or may not include one or more uniform regions. As an example, a uniform layer may be formed via coating followed by a deposition of material to form a desired pattern that may be deposited over the uniform layer. Or, for example, a desired pattern may be formed and a layer deposited over the desired pattern.

In the example of FIG. 5, the mixing bock 530 can include one or more options to ultimately provide an electrode material with a mix of the pre-mix A 522 and the pre-mix B 524. For example, consider using a mixer prior to coating per a mixer block 532, using one or more sprayers per a sprayer block 534, using one or more pre-coats per a pre-coat block 536, etc. As an example, a pre-mix may be a slurry or a powder. For example, consider a method that includes coating using one or more powders and/or one or more slurries. Such a method can include spraying, which may include wet spraying and/or dry spraying (e.g., using one or more jets, etc.). As an example, a method can include pre-coating a substrate with one or more materials. For example, consider pre-coating with high surface conductive carbon. As an example, a method can include using a mixing nozzle or nozzles (e.g., a jet or jets, etc.) such that continuous mixing occurs during deposition. For example, consider spraying multiple pre-mixes through one or more nozzles. As an example, a method can include deposition followed by drying followed by deposition. In such an example, drying may aim to achieve a certain level of drying, which may be fully dry or less than fully dry. For example, consider coating using a first pre-mix followed by some amount of drying of the first pre-mix and then followed by coating using a second pre-mix, where drying, as appropriate may occur thereafter.

As an example, a method can account for one or more variables which may include one or more of solid powder concentration, chemical blending, atomic weight, density, miscibility, grain shape, particles size, composition/proportion and dosage, segregation, agglomeration, sequences of mixing, sequences of depositing, sequences of drying, mixing devices, mixing techniques, mixing speeds, timing of mixing, and operational conditions.

Referring again to FIG. 4, some points are indicated by black circles where one or more quality assessments may be performed. For example, a quality assessment method may be performed during coating and/or drying, during calendaring, after aging, etc. At one or more of such points, one or more quality assessments may be performed, for example, to determine one or more characteristics of an electrode or electrodes. For example, consider performing a quality assessment to determine distribution of one material with respect to another material (e.g., silicon with respect to graphite, etc.). In such an example, one or more processes such as material preparation, pre-mix formulation, etc., may be adjusted using feedback from a quality assessment, for example, in an effort to improve the distribution of one material with respect to another material, whether in one or more formulations prior to deposition and/or as to one or more deposited layers, patterns, etc.

Figure 6:
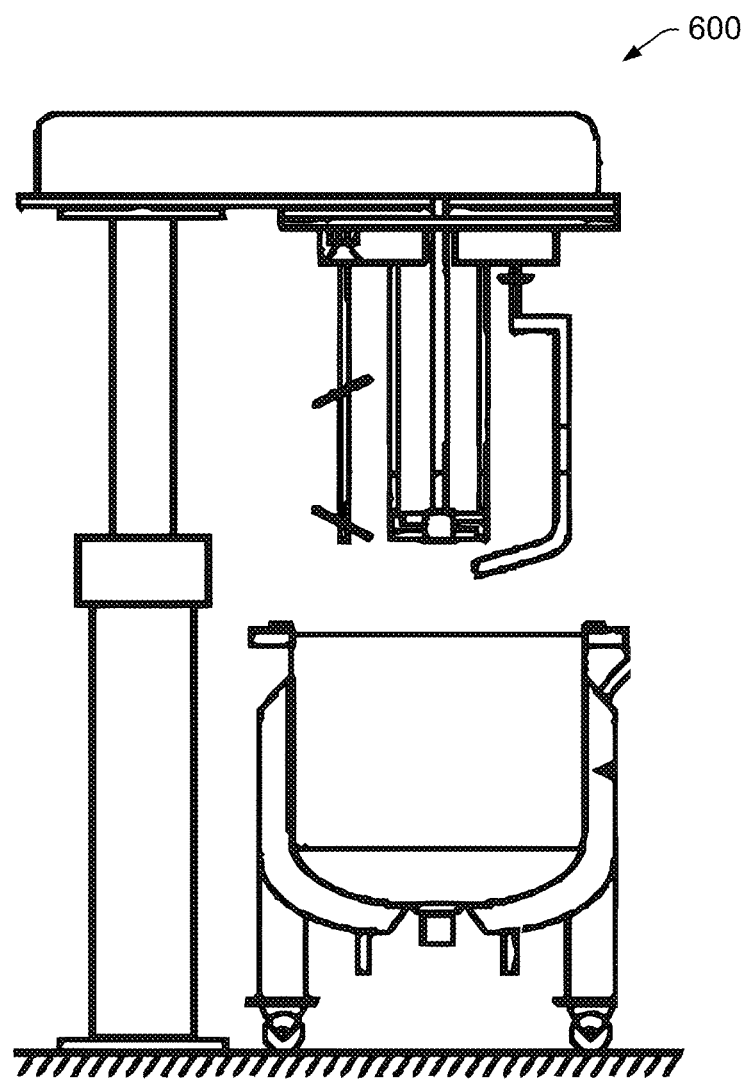
FIG. 6 is a diagram of an example of a mixer.

FIG. 6 shows an example of a mixer 600 that is operable as a planetary mixer. The mixer 600 can include a motor, a scrubber, an emulsifier blade assembly, an eccentrically rotating paddle, a jacketed and insulated bowl and a trolley.

As an example, a mixer for LIB slurry production can include one or more of a planetary mixer, a variable speed mixer, a static mixer, an extruder and a dissolver. As an example, a smaller scale (e.g., lab scale, etc.) mixer may include a ball mill, a magnetic stirrer, a 3D mixer, a turbine stirrer, or another type of mixer.

As to a mixing speed, as an example, where a typical speed may be in a range of approximately 0 to approximately 1400 RPM, a slow speed may be less than 50 RPM. As to a mixing speed, as an example, where a typical speed may be in a range of approximately 0 to approximately 70 RPM, a slow speed may be less than 10 RPM. Thus, a slow speed can be a fraction of an upper speed. For example, 50 RPM is approximately 3.6 percent of 1400 RPM and 10 RPM is approximately 14.3 percent of 70 RPM. As an example, a slow speed may be less than 50 percent of a fast speed.

As an example, particles may be mixed with one or more other materials to form a slurry and/or a powder. As mentioned, a slurry may be defined as a mixture of a liquid and solid particles that retain some fluidity. As an example, viscosity of a slurry may be described as relative to the viscosity of a liquid phase. As an example, a population of particles may be provided in a liquid phase as a slurry. As an example, populations of particles may be provided in liquid phase as slurries, for example, one slurry per population of particles and/or one slurry for multiple populations of particles.

As an example, an electrode may be formed from a slurry or slurries that includes active electrode particles (e.g., a solid phase) in a liquid phase. As an example, to fabricate a positive electrode, for example, a slurry may be prepared by dispersing an electrode active material in a solvent followed by applying the slurry to a surface (e.g., an electrode current collector) and, for example, removing the solvent by drying.

As an example, an electrode may include electrolyte. For example, consider an electrolyte that includes $Li(ClO4)_2$ in polycarbonate/tetrahydrofuran (PC/THF) (e.g., about 0.4 M).

As an example, a fluid phase in a slurry may include one or more solvents. As an example, a solvent may be xylene, dimethyl formamide (DMF), dimethyl acetamide (DMAc), tetramethyl urea, dimethyl sulfoxide (DMSO), triethyl phosphate (TEP), N-methyl-2-pyrrolidone (NMP), acetone, tetrahydrofuran (THF), methyl ethyl ketone (MEK), methyl isobutyl ketone (MIBK), a glycol ether, n-butyl acetate, cyclohexanone, and water.

As explained, an electrode may be an anode electrode or a cathode electrode. As an example, a pre-mix may include $LiMn_2O_4$ or one or more other materials that include lithium (e.g., in a range from about 18 percent to about 25 percent by weight), conductive carbon (e.g., in a range from about 0.8 percent to about 3 percent by weight), additive(s) (e.g., in a range from about 0.8 percent to about 3 percent by weight), water and/or organic solvent (e.g., in a range from about 70 percent to about 80 percent). In such an example, the pre-mix may be a slurry that may include particles, for example, in one or more populations, that include particle sizes of $LiMn_2O_4$ of about 60 nm to about 300 nm, that include particles of conductive carbon from about 0.1 micron to about 1.8 micron, etc. As an example, a slurry may have a viscosity in a range of about 2500 cP (mPas) to about 7500 cP (mPas) at about 25 degrees C. As an example, consider that water has a viscosity of about 1 cP at about 20 degrees C. and that honey may have a viscosity of about 2000 cP to about 10000 cP. As an example, where a mix is a slurry (e.g., a pre-mix or other mix), one or more techniques may be utilized to adjust viscosity, which may be via composition, additives, temperature, etc.

As an example, an additive may be carboxy methyl cellulose (CMC) and/or polyvinyldifluoride (PVDF) for modifying viscosity and/or styrene butadiene rubber (SBR) as an adhesion resin.

As an example, active electrode particles may be provided in one or more populations where, for example, each population includes a median or a mean particle size in a range from about 0.015 microns (15 nm) to about 15 microns. As an example, a ratio of median or mean particle size (e.g., or maximum frequency size) of a first population to a median or mean particle size (e.g., or maximum frequency size) of a second population may range from about 3 to about 1000. As an example, a mixture of two populations may be characterized by a bimodal PSD where the ratio of a median or mean particle size (e.g., or maximum frequency size) of one population (e.g., one mode) to the median or mean particle size (e.g., or maximum frequency size) for the other population (e.g., another mode) is greater than about 5, which may provide (e.g., theoretically) for nondisturbing packing. A U.S. Published Patent Application having Publication No. 20150072230 A1, published 12 Mar. 2015, is incorporated by reference herein.

FIG. 7 shows a table 700 with some examples of anode materials that include lithium along with values of specific capacity and approximate values of volume change. As mentioned, one or more materials can be utilized to form an electrode. As an example, an electrode may be formed using one or more of the anode materials in the table 700.

As to utilization of silicon, a crystalline silicon anode has a theoretical specific capacity of 3600 mAh/g (see, e.g., $Li_{15}Si_4$), approximately ten times that of a graphite anode that may be considered to be theoretically limited to 372 mAh/g (see, e.g., $LiC_6$). The higher specific capacity is due to the fact that a silicon atom can bind up to 3.75 lithium atoms in its fully lithiated state compared to one lithium atom per 6 carbon atoms for a fully lithiated state of graphite.

As indicated in the table 700, however, the lattice distance between silicon atoms increases as it accommodates lithium ions (lithiation), reaching 320 percent of original volume. Such expansion can generate substantial stresses within an electrode, which may result in fracture formation and, for example, detachment from a collector. As explained, distribution of silicon may be a factor that can be controlled during manufacturing of an electrode such that a desirable distribution of silicon can be achieved. As an example, a desirable distribution of silicon may provide for an improved electrode, which may be improved with respect to one or more of current, temperature, diffusion and stress (e.g., internal, thermal, lithiation-related, etc.).

As explained, an electrode may be formed using graphite and silicon, where, for example, the mass percentage of silicon may be less than that of graphite. In such an example, silicon particles may be relatively small such as, for example, silicon nanoparticles. As an example, a binder and/or one or more other additives may be utilized to improve stress properties, particularly for cycling as lithiation and de-lithiation occur. As an example, utilization of some amount of silicon can increase specific capacity of a LIB and/or provide for making a smaller LIB with a specific capacity that is approximately equal to a larger LIB without silicon.

Figure 8:
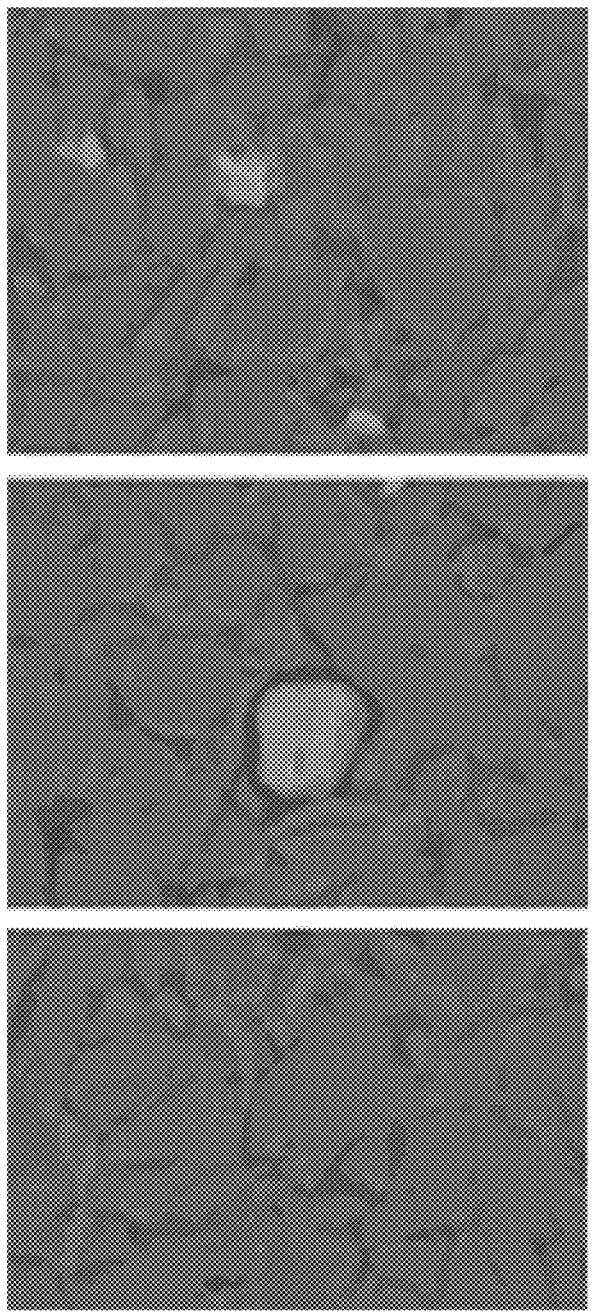
FIG. 8 is examples of images.

FIG. 8 shows a series of images 800 from three different regions of an electrode that includes graphite and silicon. As shown, silicon distribution may vary from region to region. As explained, a method can be utilized that can provide for a desirable distribution of silicon and/or distribution of one or more other materials, for example, with respect to graphite, etc. As explained, such a method can be performed by preparation of one or more pre-mixes where at least one of the pre-mixes includes a material that can be more uniformly distributed in a depositable manner where deposition can aim to achieve a pre-determined desirable distribution. In other words, if a mixture to be deposited is not uniform, then it can be quite difficult to make an electrode material with a desirable distribution of a component of that mixture. In contrast, where a mixture to be deposited can be made to be quite uniform, then it can be easier to make an electrode material with a desirable distribution of a component of that mixture. Further, where one or more quality assessment techniques provide for determining how that component is distributed, a feedback loop can be established that can help to assure and/or improve achievement of a desirable distribution of a component in an electrode material.

FIG. 9 shows tables 910 and 920 of examples of constituents of a slurry B and a slurry A, respectively, for forming a 1 percent by mass silicon oxide slurry. As shown, each of the slurries includes graphite, silicon oxide, conductive carbon additives, binder (e.g., PVDF) and solvent (e.g., NMP). The slurry B of the table 910 has a total mass of 21.11 grams while the slurry A of the table 920 has a total mass of 973.81 grams such that a mixture of slurry A and slurry B would have a mass of 994.92 grams (approximately 1 kg). As indicated in the tables 910 and 920, the slurry B includes silicon oxide and the slurry A does not include silicon oxide while the dry percentage of binder (e.g., 5 percent) and the dry percentage of conductive carbon additives (e.g., 1 percent) are each the same in the slurries A and B. As to solvent, similarly, the wet mass percentage (e.g., 46 percent) is the same for the slurries A and B where the total solids content is approximately 54 percent.

As an example, a method can include mixing the slurry A for 60 minutes and mixing the slurry B for 60 minutes and then mixing the slurries A and B together, as a mixture, for 30 minutes. In such an example, consider mixing using a planetary mixer.

FIG. 10 shows tables 1010 and 1020 of examples of constituents of a slurry B and a slurry A, respectively, for forming a 10 percent by mass silicon oxide slurry. As shown, each of the slurries includes graphite, silicon oxide, conductive carbon additives, binder (e.g., PVDF) and solvent (e.g., NMP). The slurry B of the table 1010 has a total mass of 200.08 grams while the slurry A of the table 1020 has a total mass of 799.92 grams such that a mixture of slurry A and slurry B would have a mass of 1000 grams (1 kg). As indicated in the tables 1010 and 1020, the slurry B includes silicon oxide and the slurry A does not include silicon oxide while the dry percentage of binder (e.g., 5 percent) and the dry percentage of conductive carbon additives (e.g., 1 percent) are each the same in the slurries A and B. As to solvent, similarly, the wet mass percentage (e.g., 46 percent) is the same for the slurries A and B where the total solids content is approximately 54 percent.

As an example, a method can include using conductive additives. For example, consider anode and/or cathode conductive additives. For a positive electrode, consider one or more of the C-NERGY additives (e.g., KS 6L, SUPER C65, SUPER C45, etc.), which may be provided in a mass dosage of approximately 0.1 percent to 8 percent. As to a negative electrode, consider using one or more of the C-NERGY additives (e.g., SFG 6L, SUPER C65, SUPER C45, etc.), which may be provided in a mass dosage of approximately 0.1 percent to 10 percent. As an example, for a negative electrode, SFG 6L may be utilized up to and including approximately 10 percent while SUPER C65 and SUPER C45 may be utilized up to and including approximately 1 percent.

As an example, a method can include mixing the slurry A for 60 minutes and mixing the slurry B for 60 minutes and then mixing the slurries A and B together, as a mixture, for 30 minutes. In such an example, consider mixing using a planetary mixer.

As explained, an ability to provide an LIB with at least one electrode with a desirable distribution of one or more materials can improve LIB performance over time. As explained, such an LIB can be achieved using a pre-mix or pre-mixes. Such an approach can, for example, achieve a more uniform slurry dispersion when low percentages of one or more heavy elements, silicon (e.g., in one or more forms) and/or one or more other materials are utilized in electrode formation.

As an example, a method can aim to achieve an effective and substantially homogenous slurry with relatively uniform dispersion of different solids therein. Such a method can consider one or more of the following factors: solid powder concentration, chemical blending, atomic weight, materials with different densities and no miscibility, different grain and particles sizes, material composition and proportion and dosage, segregation and agglomeration, mixture and blending sequences, type of mixing device(s), mixing rotations and timing, and operating conditions.

As explained, a low speed can be utilized for mixing a pre-mix that includes an additive that has a density that is greater than that of graphite. For example, where a silicon additive is included with graphite in a first pre-mix and where a second pre-mix does not include silicon as an additive, the mixing speed for preparing the first pre-mix can be less than the mixing speed for preparing the second pre-mix. In such an example, through use of a lower mixing speed, the silicon additive can be more uniformly dispersed with respect to the graphite in the first pre-mix where the first pre-mix is a first slurry and where the second pre-mix is a second slurry where the first and second pre-mixes, and hence first and second slurries, are to be combined and mixed.

As explained, a workflow can include coating a substrate with one or more mixtures (e.g., pre-mixes, mixtures of pre-mixes, etc.) to form an electrode for a LIB. In such a workflow, if a mixture is more uniform with respect to its constituents, then the resulting coating may be more uniform with respect to its constituents, which may include fewer constituents and/or different constituents upon drying (e.g., evaporating solvent, polymerizing a binder, etc.). As explained, where silicon is utilized in combination with graphite to form an electrode, an ability to achieve a desirable distribution of silicon (e.g., whether uniform or patterned) can improve performance of the electrode and hence a LIB made from one or more of such electrodes.

Figure 11:
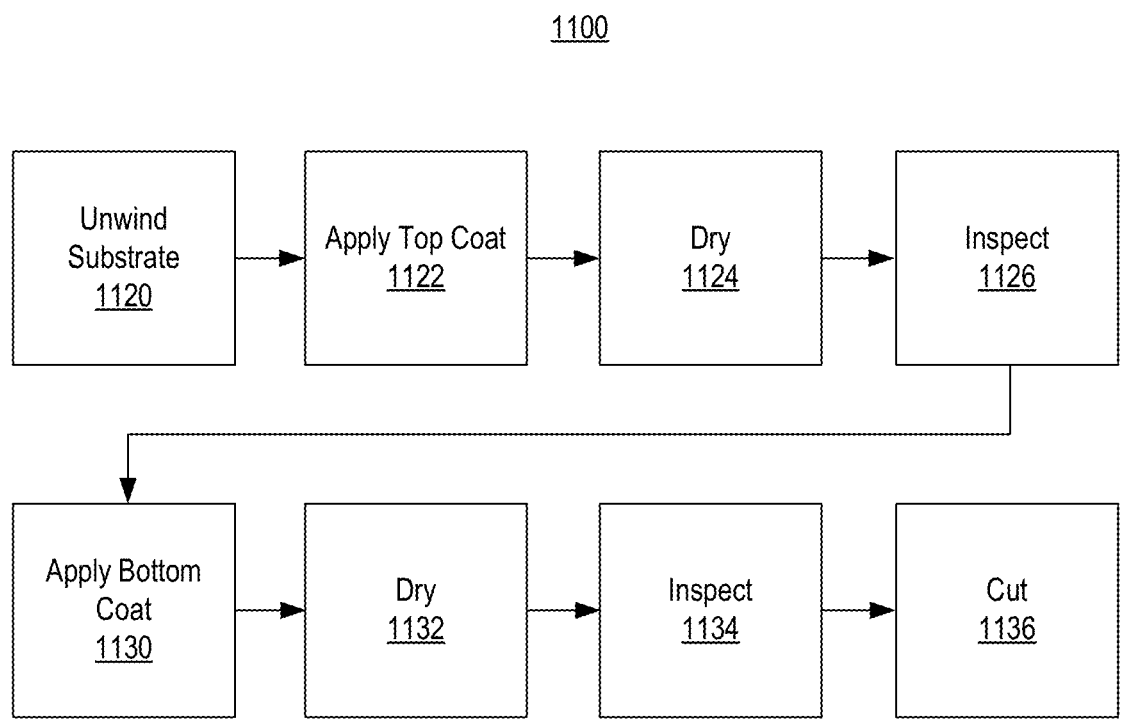
FIG. 11 is a diagram of an example of a method.

FIG. 11 shows an example of a method 1100 that includes an unwind block 1120 for unwinding a substrate, an application block 1122 for applying a top coat to the substrate, a drying block 1124 for drying the top coat, an inspection block 1126 for inspecting the top coat, an application block 1130 for applying a bottom coat to the substrate, a drying block 1132 for drying the bottom coat, an inspection block 1134 for inspecting the bottom coat and a cutting block 1136 for cutting the coated substrate. As explained, one or more application (e.g., deposition) processes may be utilized optionally along with one or more drying processes. As explained, a method can include one or more deposition processes that use at least one mix of materials that provides a homogeneous distribution of a material (e.g., silicon, etc.) in the mix. As explained, such a method can provide for making an electrode material with a desirable distribution of that material, which may be a spatially uniform distribution and/or a spatially patterned distribution.

As an example, a spatially patterned distribution may include one or more regions that are discrete and/or one or more regions that have a gradient. For example, a rectangular-shaped electrode material may have a desirable distribution of a material where there is a different amount of the material at its center than near its edges. As another example, consider a desirable distribution that depends on tab locations. As mentioned, current patterns during operation can depend on tab locations. As an example, a material may be distributed according to current modeling where the current modeling accounts for at least one tab location. In such an approach, various aspects of one or more of current, temperature, diffusion and volumetric lithiation effects may be taken into account to reduce risk of issues and/or to improve performance of an LIB.

As explained, a lithium-ion cell or cells may be formed using one or more coated substrates that form an electrode or electrodes. Such a cell or cells may be part of a LIB.

As mentioned, uniformity of distribution of one material with respect to another, different material can be challenging. As to silicon and graphite, they have different properties, which can make achieving uniformity difficult (e.g., in a mix to be deposited onto a substrate and, hence, an electrode).

As explained, current, temperature and diffusion can be related during operation of a LIB. As an example, a method can include accounting for one or more properties of materials to assess how a distribution may impact LIB operation and, for example, to determine whether a uniform distribution in an electrode is desirable and/or whether a patterned distribution in an electrode is desirable. Further, one or more quality assessment techniques may be utilized that may depend on one or more material properties, which can include, for example, thermal properties and/or other material properties.

Crystalline silicon has a melting point of 1410 degrees C. and a boiling point of 3265 degrees C. The thermal conductivity of crystalline silicon is 148 W/m-K (300 K). Crystalline silicon has a specific heat of 0.71 J/g-K, and a linear thermal expansion coefficient of $2.6 \times 10^{-6}$/K.

Silicon oxide (silicon dioxide) has a density of about 2.65 g/cm$^3$, a melting point of 1713 degrees C. and a boiling point of 2950 degrees C. The thermal conductivity of silicon oxide is about 1.4 W/m-K and the specific heat is about 1.0 J/g-K. Silicon oxide has a thermal expansion coefficient of $5.6 \times 10^{-7}$/K. Silicon dioxide has a Young's modulus of about 75 GPa.

Graphite is a crystalline form of the element carbon with its atoms arranged in a hexagonal structure. The carbon atoms are set hexagonally in a planar condensed ring system. Layers can be stacked parallel to each other. Atoms within the rings are bonded covalently, while layers are loosely linked together by van der Waals forces. Although graphite is flexible, it is not elastic and has high electrical and thermal conductivity. Graphite is also chemically inert and highly refractory.

Graphite has thermal properties of conductivity and expansion that are influenced by graphite's anisotropy. The thermal conductivity is the time rate of transfer of heat by conduction where, in graphite, it can occur by lattice vibration. Thermal conductivity, k, may be represented by the following relationship:

$$k = bCpvL$$

where b is a constant, C is the specific heat per unit volume, v is the speed of a heat-transporting acoustic wave, and L is the mean free path for wave scattering.

In the direction perpendicular to the basal plane (c direction, where ab directions are in the basal plane), the thermal conductivity of graphite is approximately 200 times lower since the amplitude of the lattice vibration in that direction is considerably lower than in the ab directions. The thermal conductivity of a graphite crystal has been reported as high as 4180 W/m-K in the ab directions for highly crystalline, stress-annealed pyrolytic graphite. However, the average value for commercial pyrolytic graphite is considerably smaller (e.g., 400 W/m-K) though still a high value such that, in the ab directions, graphite can be considered a good thermal conductor comparable to various high-conductivity metals and ceramics. As mentioned, for the ab directions, thermal conductivity of graphite may be 400 W/m-K while for the c direction it may be 2 W/m-K.

The thermal expansion of the graphite crystal has a marked anisotropy. It is low in the ab directions but higher by an order of magnitude in the c direction. The increase with temperature is not linear. In the c direction, it increases slowly and gradually. At 0 degrees C., the coefficient of thermal expansion averages $25 \times 10^{-6}$/K and at 400 degrees C., it reaches $28 \times 10^{-6}$/K. In the ab directions, the thermal expansion is negative up to approximately 400 degrees C. with a minimum at 0 degrees C. The observed negative expansion may be due to internal stress associated with large expansion in the c direction; noting that, if it were possible to measure the ab thermal expansion of a single atomic plane, this expansion would be positive. The large thermal expansion anisotropy may result in large internal stresses and structural problems such as delamination between planes.

As mentioned, graphite may have a density in a range of approximately 2.09 g/cm³ to approximately 2.23 g/cm³. Graphite has an ultimate tensile strength of 14 MPa, a Young's modulus of elasticity of 11.5 GPa, a Brinell hardness of 5 BHN, and a melting point of 3600 degrees C. Graphite has a specific heat of 0.72 J/g-K.

The specific heat of a substance is the amount of energy required to raise the temperature of 1 gram of the substance by 1 degree C. As explained with respect to the examples of FIG. 9 and FIG. 10, graphite and silicon may be present at a mass percentage of approximately 50 percent in pre-mix, which may be a slurry. In such an example, upon drying of the slurry, solvent may be reduced such that graphite and silicon are the predominant solids that can be distributed with binder and one or more electrically conductive additives.

Where an electrode is formed from approximately 80 percent or more graphite, the thermal properties of electrode material may be dominated by those of graphite. Where an electrode is heated and/or cooled, graphite orientation can determine whether thermal conduction is good or poor. As mentioned, in the c direction, graphite tends to be a poorer thermal conduction than in the ab directions. As an electrode may be a relatively thin structure, graphite may be expected to be oriented as plates such that the ab directions are parallel to a substrate.

As to silicon solids in a matrix of graphite, such solids may be between plates of graphite and/or exposed to edges of plates of graphite. In various electrodes, the silicon solids may be predominantly exposed to edges of plates of graphite such that thermal conductivity between silicon solids and graphite occurs in the ab directions rather than in the c direction. For one or more reasons, in an electrode material, dynamic thermal behavior of silicon can differ from dynamic thermal behavior of graphite.

As an example, a method can include heating and/or cooling an electrode material and using a detector to capture imagery of the electrode material where the captured imagery includes indicia of silicon distributed in the electrode material. In such an example, the method can include determining how the silicon is distributed in the electrode material. For example, consider determining whether the silicon is distributed in a desirable manner or not where a desirable manner may be a uniform distribution and/or another type of desirable distribution.

As an example, a method can include heating and/or cooling an electrode material and using a detector to capture imagery of the electrode material where the captured imagery includes indicia of change in size of the electrode material such as, for example, expansion and/or contraction. In such an example, the method can include determining how closely the electrode material behaves with respect to an estimated behavior that can be based on one or more thermal expansion coefficients.

As explained, material will expand or contract depending on the material's thermal expansion coefficient. Where material is free to move, the material may expand or contract freely without generating stresses. However, once the material is attached to a relatively rigid body (e.g., at multiple locations), thermal stresses can be created in one or more geometrically constrained regions. Such stress, σ, may be estimated by multiplying a change in temperature, ΔT, a material's thermal expansion coefficient, a, and a material's Young's modulus, E:

$$\sigma = Ea\Delta T$$

Upon a change in temperature, one or more constraints can exert a compressive force (compressive stress) on the material or a tensile force (tensile stress) on the material. As mentioned, a method can include heating and cooling of an electrode material to thereby cause thermal expansion, thermal contraction, and temperature gradients. In such a method, where the electrode material is geometrically constrained, stresses can exist, which may result in some amount of residual stress.

As an example, a method may utilize heating and/or cooling at a level sufficient to discern distribution of one type of material in an electrode material that includes another type of material. In such an example, the level may be sufficient to result in some amount of thermal expansion and/or thermal contraction that can be detectable and/or in some amount of thermal stress that can be detectable. As an example, temperature and/or time-temperature gradients may be controlled such that a quality assessment method does not introduce undesirable stresses, for example, by using too high and/or too low of temperatures and/or by generating gradients (e.g., locally) that may result in undesirable stresses that may weaken or otherwise damage electrode material under observation for quality. As an example, a quality assessment method can operate according to constraints in temperature and in time to assure that quality can be assessed with minimal risk of damage to electrode material. In such an approach, temperature may be constrained to expected operational temperatures of a LIB that is to include the electrode material (e.g., consider a range of temperatures from 5 degrees C. to 50 degrees C., etc.). As to one or more temperature gradients as constraints, they may be specified in terms of degrees per unit time (e.g., less than 0.5 degree per second, etc.). As an example, one or more constraints may be determined using laboratory experiments and/or modeling.

As an example, a method can be a quality control method that can assess one or more characteristics of an electrode material. For example, consider assessing distribution of one material with respect to another material, which may be via an image based assessment as to distribution of a particular material and/or as to distribution of expansion, contraction and/or stress. As an example, consider silicon solids in graphite where, due to differences in thermal properties between the silicon solids and the graphite, one or more physical phenomena can be observed that are indicative of one or more quality metrics. In such an example, consider maldistributed silicon solids in an electrode material, which can be observed via a detector that may indicate positions of the silicon solids and can be observed via a detector that may indicate expansion, contraction or stress that is deviates from that of an electrode material that does not have a maldistribution of silicon solids.

As an example, a polariscope may be utilized as a detector (e.g., a sensor). A polariscope can operate based on the property of birefringence. When a ray of light passes through a photoelastic material, it becomes polarized and gets resolved along the two principal stress directions and each of these components experiences different refractive indices. The difference in the refractive indices leads to a relative phase difference between the two component waves, which can be referred to as phase retardation. The magnitude of the relative retardation can be given by the stress optic law.

As an example, such a property may be that of a substrate and/or that of an electrode material. As explained, where an electrode material is constrained by a constraining material (e.g., a substrate), the constraining material can be stressed, for example, responsive to thermal energy supplied to the electrode material. In such an example, depending on optical characteristics, stress may be observed for the electrode material and/or for the constraining material (e.g., substrate).

As an example, an electrode material and/or a substrate may be sufficiently transparent such that stress can be observed with a polariscope. As an example, an electrode material may include graphite and lithium where the presence of lithium can alter the optical properties of the graphite to make the graphite more transparent. Lithium provides electrons to graphite, enhancing its conductivity, where the extra electrons make the graphite more transparent, due to a quantum-mechanical effect. An article by Yang et al., Transparent lithium-ion batteries, Proceedings of the National Academy of Sciences, 108(32):13013-8, August 2011, is incorporated by reference herein. A dissertation by Li, Study of Stress Measurement Using Polariscope, Georgia Institute of Technology, August 2010, is incorporated by reference herein, which describes an experimental infrared transmission technique to extract the full stress components of the in-plane residual stresses in thin multi crystalline silicon wafers.

As to use of birefringence (e.g., a polariscope, etc.), when light passes through a crystalline solid, the photons interact with the atoms of the solid, where some photons are absorbed with a wavelength shorter than the band gap and converted to charge carriers and others are transmitted. The transmission spectrum for silicon tends to be opaque to the ultraviolet and visible light but the transmission ratio rises sharply to over 50 percent around 1100 nm, being almost constant in the near infrared spectrum range. As an example, a suitable wavelength or wavelengths may be selected for imaging of a material (e.g., a substrate, an electrode material, a material within an electrode material, etc.) based on a spectrum analysis.

As mentioned, one or more types of optical sensors may be utilized. For example, consider an infrared sensor that may be provided as a camera. Such a camera may include one or more interfaces (e.g., IEEE 802.3 1000BASE-T, IEEE 802.3af power over Ethernet (PoE), etc.), a resolution (e.g., 640 (H)×512 (V), etc.), a sensor (e.g., InGaAs FPA 640×512, etc.), a pixel size (15 μm×15 μm, etc.), a lens mount (e.g., C-mount, etc.), a frame rate (e.g., 300 fps, etc.), an ADC bit specification (e.g., 14 bit, etc.), an image buffer (e.g., 256 MB, etc.), etc. As an example, such a camera may be utilized for one or more purposes with respect to a process, which may include one or more quality assessment purposes.

Figure 12:
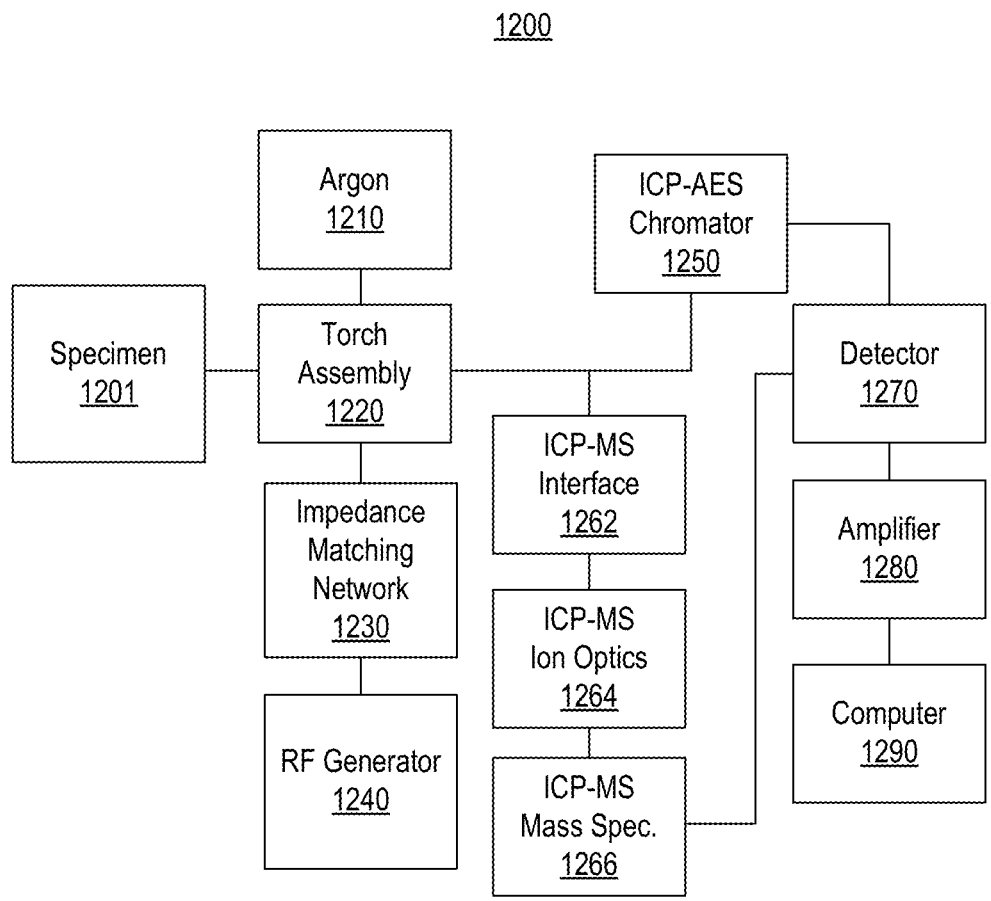
FIG. 12 is a diagram of an example of analytical equipment.

FIG. 12 shows an example of analytical equipment 1200 that may be or include features for inductively coupled plasma/atomic emission spectrometry (ICP-AES) and/or inductively coupled plasma/mass spectrometry (ICP-MS). As shown in the example of FIG. 12, a specimen 1201 can be introduced to the analytical equipment 1200 where the analytical equipment 1200 can include an argon source 1210, a torch assembly 1220, an impedance matching network 1230 and a radio-frequency generator 1240 where the torch assembly 1220 can be operatively coupled to components for ICP-AES and/or ICP-MS. As shown, an ICP-AES chromator (poly or mono) 1250 may be provided and/or an ICP-MS interface 1262, an ICP-MS ion optics 1264 and an ICP-MS mass spectrometer 1266 may be provided. Such components can be operatively coupled to a detector 1270 that provides output to an amplifier 1280 that can be operatively coupled to a computer 1290 for analysis of results of the specimen 1201, which can include quantitative results and/or qualitative results, which, as explained may be utilized to assess quality of a process such as, for example, an electrode manufacturing process. Output from the analytical equipment 1200 may be utilized to revise, tailor, etc., one or more processes for making an electrode or electrodes.

As an example, analytical equipment may be used to selectively determine the concentrations of silicon. However, specimen (e.g., sample) preparation may be tedious and manual where silicon extraction is performed to extract silicon from an electrode material, for example, using invasive chemicals that may interfere with detection, particularly with low silicon concentration. As an example, one or more quality assessment techniques may provide for reasonable specificity and sensitivity, while being relatively inexpensive, safe, and rapid.

As to some examples of existing silicon extraction techniques that extract silicon from an electrode, these may utilize a strong base or a strong acid. For example, consider use of potassium hydroxide (KOH); however, a high concentration of potassium can interfere with the ICP-based results and may be limited to samples with a relatively high amount of silicon. As to an acid example, consider nitric acid ($HNO_3$); however, the dissolution is limited and detected content may be far lower than the actual content. As to nitric acid with a small amount of hydrogen fluoride (HF), a disadvantage is creation of the toxic gas silicon tetrafluoride ($SiF_4$).

As an example, a chemical extraction technique for an anode electrode can involve dissolution using water along with sonication. As an example, a technique may employ sampling during manufacturing, for example, prior to a pre-drying or other drying process. In such an example, equipment such as, for example, the technical equipment 1200 of FIG. 12 may be utilized (e.g., for performing ICP-AES and/or ICP-MS). While ICP-AES can allow for both trace and major concentrations across a wide range of elements down to part per billion (ppb), ICP-MS may provide a lower detection limit down to part per trillion (ppt).

As an example, a sampling technique may include using sample sizes that can provide for determinations as to distribution of silicon with respect to graphite. For example, consider a sample size that may be an entire electrode size or a portion of an electrode in size. As an example, sample sizes may be as small as a millimeter for a technical analysis, noting that an imaging technique, which may be a non-destructive technique, may provide for finer sample sizes that correspond, for example, to pixel sizes.

As an example, a quality assessment technique may be performed in an inline manner. For example, consider a technique that can be performed continuously using infrared (IR) mapping, which may include heating and/or cooling of electrode material (e.g., consider alternating heating and cooling or cooling and heating). In such an example, a camera such as an IR camera may be utilized.

FIG. 13 shows examples of processing equipment 1310 and 1350 that include coating and drying units. The processing equipment 1310 can coat both sides of a substrate prior to drying while the processing equipment 1350 coats one side, then dries that coated side and then coats the other side followed by drying of the coated other side. Such equipment can include rollers, tension rollers, calendaring rollers, inspection frames, motors, etc. Such equipment may be computer controlled. As to calendaring, the processing equipment 1310 includes opposing rollers disposed between drying unit and a take-up roller for taking up coated, dried and calendared material. As to inspection frames, these may be mounted with one or more types of sensors, which may be static or dynamic. For example, a static sensor may remain stationary while a dynamic sensor may be movable.

As an example, process equipment may include one or more drying units, which may utilize one or more forms of heating. For example, consider one or more of infrared, microwave, radiofrequency, and gas heating. As solvent, if present, evaporates, an electrode material may shrink, which, for example, may result in some amount of internal stress. In general, an electrode material is to be in contact with a substrate (e.g., a collector, etc.), which, as mentioned, for an anode electrode material may be copper and for a cathode electrode material may be aluminum.

As to an electrode dissolution technique, consider anode electrode dissolution with water using sonication. In such an example, an analysis may consider electrode mass with copper and electrode mass minus copper and minus graphite to provide silicon mass. In such an example, a method can commence by providing a pouch cell and peeling off the pouch packaging for removal of a core (e.g., a jelly roll, etc.). Next, cathode and anode materials can be separated. As to the anode material, it can be cut into relatively small pieces (e.g., consider 1 cm×5 cm or smaller). Next, carbon material can be separated from copper foil using an ultrasonic leaching technique. Ultrasound leaching tends to be an environmentally-friendly and efficient technique for the separation of copper and carbon powder as it can work using water, for example, without use of chemical reagents. Further, energy consumption tends to be reasonable (e.g., relatively low).

In a trial process, a quantity of 0.25 g of anode material was weighed and put into an electrothermal drying chamber at a constant temperature of 120 degrees C. for 1 h. After cooling, the anode material and copper foil were separated completely at normal room temperature after 2 minutes of ultrasound treatment. The separated copper foil and carbon powder were then dried in an electrothermal drying oven at a constant temperature of 120 degrees C. for 1 h. The carbon powder content in the anode material was calculated to be 77 percent. As explained, silicon mass can be determined by subtracting copper mass and graphite mass from an electrode mass. Copper mass may be known a priori (e.g., based on size, etc.) and/or by direct weighing (e.g., of separated copper foil, etc.) while graphite mass may be determined as outlined above.

As an example, a production line can generate a strip of electrode material where samples of a certain size or sizes may be taken at intervals. For example, consider end samples and an intermediate sample. Such an approach can provide an indication of silicon content of the electrode material.

As an example, a quality assessment method may include taking samples with respect to one or more drying processes, such as, for example, before drying, after drying, etc. As an example, consider taking a sample of 10 cm in length from a back end before drying and another sample of 10 cm in length from a front end before drying.

As to making sampling easier, a method can include use of self-adhesive, removable protective file, which may provide for sampling without cutting a roll of material. As an example, a method can include positioning a self-adhesive removable protective film onto a substrate where coating can occur to coat the substrate and the protective film. In such an approach, the protective film, as coated, can be removed from the substrate for purposes of analysis. For example, consider dissolving the coating on the protective film using a suitable solvent, which may be or include water and/or NMP. The dissolved coating can then be treated as a specimen for purposes of analysis.

Figure 14:
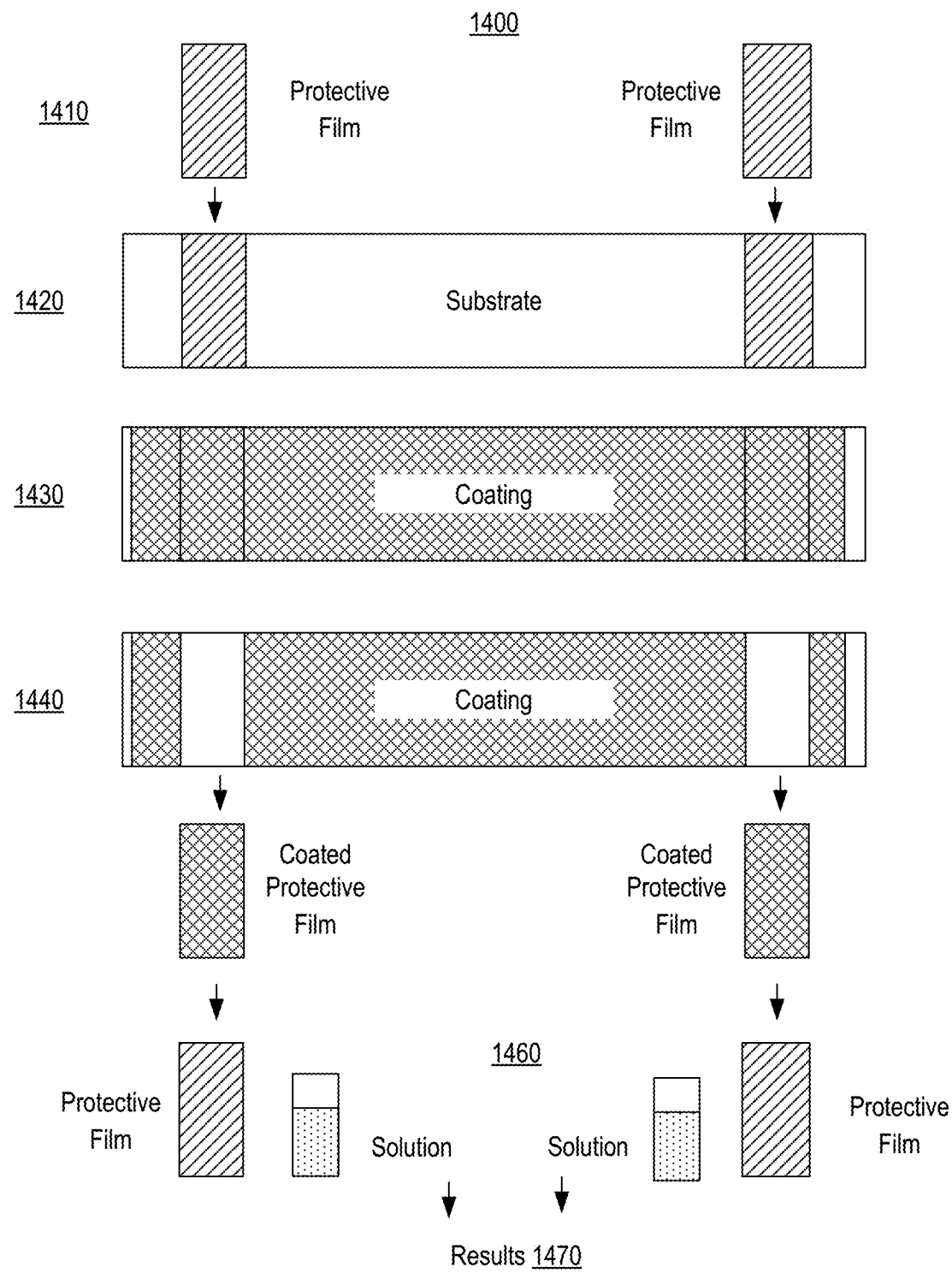
FIG. 14 is a diagram of an example of a method.

FIG. 14 shows an example of a method 1400 that includes providing protective film 1410, placing the protective film onto a substrate 1420, coating the substrate and the protective film 1430, removing the coated protective film 1450 and removing coating material from the protective film 1460. In such an example, the removed coating material can be analyzed to generate results 1470. Such results may provide for an indication of quality of one or more aspects of a manufacturing process for making an electrode material. As an example, one or more analytical techniques may be utilized using analytical equipment (see, e.g., FIG. 12).

Figure 15:
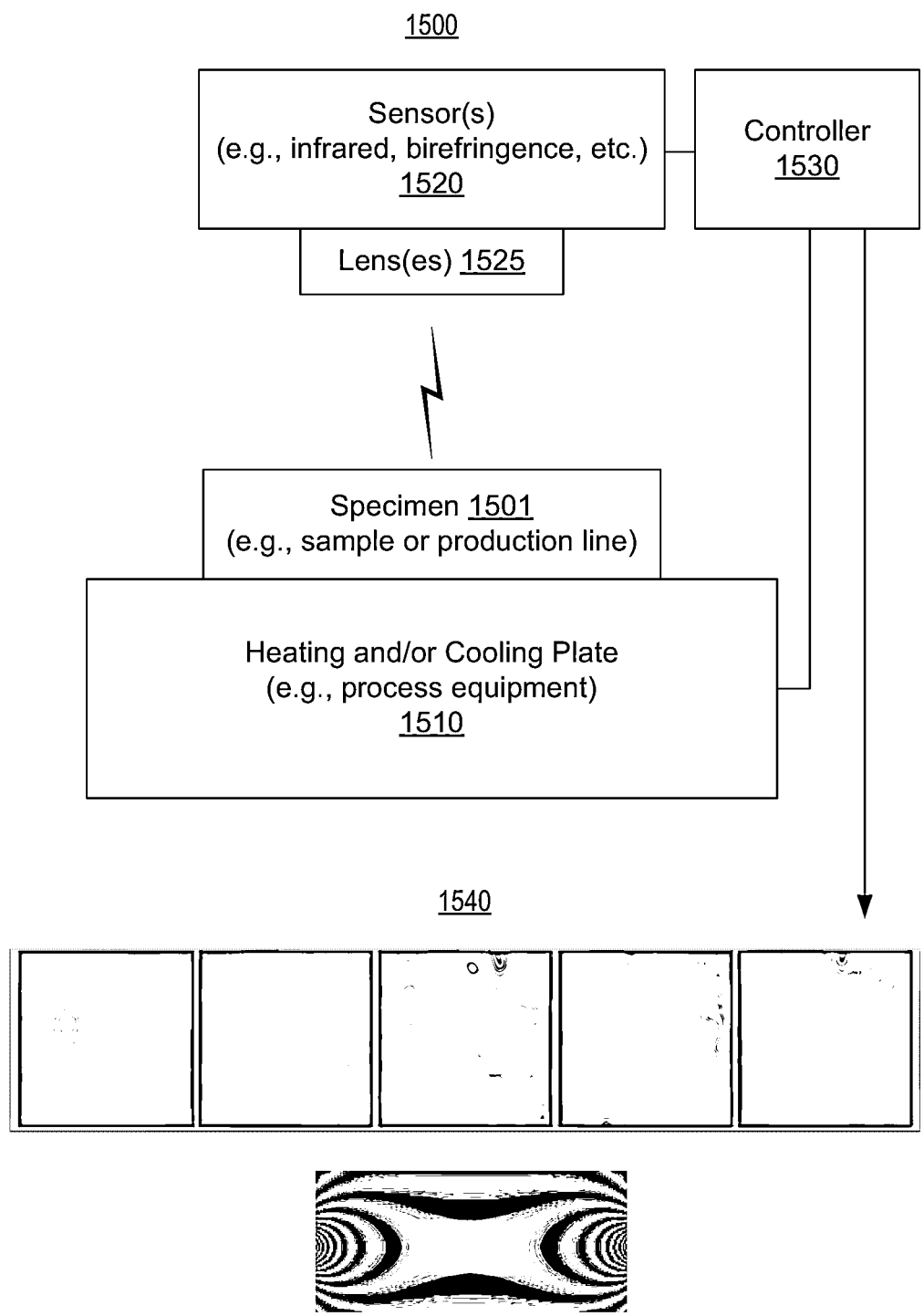
FIG. 15 is a diagram of an example of a system.

FIG. 15 shows an example of a system 1500 that can perform one or more methods for analysis of a specimen 1501, which may be a specimen of electrode material (e.g., a sample or a production line specimen). As shown, a heating and/or cooling plate 1510 may be provided that can heat and/or cool the specimen 1501, which may be a stationary specimen and/or a moving specimen. As an example, the heating and/or cooling plate 1510 may be part of process equipment and/or may be provided in another form to heat and/or cool a specimen. In such an example, one or more sensors 1520, which may include one or more infrared sensors, may be utilized, optionally with one or more lenses 1525 (e.g., or one or more other optical elements) to capture imagery 1540 of the specimen 1501 (e.g., consider infrared, birefringence, etc.). In the example of FIG. 15, the imagery 1540 may be from a single side of the specimen 1501, noting that a system may provide for capturing imagery from multiple sides of a specimen.

As shown in FIG. 15, the system 1500 can include a controller 1530 that may provide for controlling one or more components of the system 1500 and/or controlling one or more components of process equipment (e.g., material preparation equipment, line equipment, etc.). As an example, the system 1500 can be a quality assessment system where the controller 1530 can generate output for process equipment and/or other equipment. In such an example, the output can include output that instructs process equipment to adjust at least one process parameter related to dispersal of material with respect to a conveyed substrate, which may be coated, partially coated and/or uncoated.

In the example of FIG. 15, the imagery 1540 may be captured with respect to time and/or with respect to heating and/or cooling of the plate 1510 (e.g., or plates). As an example, rather than a plate, which may be in contact with the specimen 1501 or a distance from the specimen 1501, one or more other techniques may be utilized for heating and/or cooling, which may include use of one or more emitters, gas streams, etc. For example, a heating and/or a cooling gas stream may be utilized. As an example, cooling and/or heating may occur responsive to ambient temperature exposure. As an example, heating may occur responsive to exposure to a drying unit, which may use heat to evaporate a solvent or solvents. Where a strip of electrode material moves through a drying unit that utilizes heat, cooling may occur where one or more sensors may be utilized to capture imagery during cooling. As an example, where one or more rollers are utilized, one or more of the rollers may be temperature regulated such that a roller may be utilized to heat and/or cool an electrode material.

In the example of FIG. 15, the imagery 1540 is shown as including one or more of infrared imagery and birefringence imagery, noting that an ability to acquire birefringence imagery can depend on one or more properties of a substrate, an electrode material, etc. As an example, imagery may be a series of images such as images with respect to time where changes in the images can be discerned, for example, at different times with respect to heating and/or cooling of a specimen.

FIG. 16 shows examples of equipment 1610 and 1650 where black boxes indicate some examples of positions for sensors that may include sensors for image capture using, for example, one or more cameras (e.g., infrared cameras, etc.).

In the example of the equipment 1610, sensors may be positioned for capturing imagery (a) after one or more coating units and before one or more drying units and/or (b) after one or more drying units. In such an example, imagery may be compared, for example, to ascertain how one material is distributed with respect to another material (e.g., silicon with respect to graphite).

As an example, one or more sensors may be utilized with respect to one or more of slurry, electron beam curing, spray-painting, 3D printing, pulse-laser deposition, spray-drying, freeze-casting/freeze-drying, dry pressing, and electrostatic spray deposition processing equipment and/or techniques. As mentioned, one or more methods, techniques, systems, etc., may be applied to one or more of slurry and/or one or more of such alternative techniques. As an example, a process may utilize multiple techniques.

As mentioned, imagery may be utilized for one or more purposes where such imagery can be or can include thermal imagery. As explained, various materials may behave differently in response to heating and/or cooling. And, as mentioned, in some instances, stress information may be ascertained through imagery, which may include thermal stress imagery and/or non-thermal stress imagery. As explained, thermal stress may be a result of expansion and/or contraction responsive to heating and/or cooling.

As an example, internal stress of an electrode material may be affected by thermal gradients, by drying, etc. As an example, a method can include capturing imagery before drying and/or after drying to ascertain internal stress and/or distribution of material. For example, such a method may aim to ascertain aspects of thermal stress in multiple solvent states and/or to ascertain effects of different solvent states, where, for example, evaporation of solvent may cause internal stress.

In the example equipment 1650, sensors may be positioned with respect to drying units and/or with respect to rollers. As an example, as material pass over a roller, the shape of the material may be altered, which may provide for sensing of particular information, whether information as to distribution of material and/or stress-related information. In the example equipment 1650, rollers may be utilized of one or more diameters to make turns at angles such as angles of approximately 90 degrees, approximately 180 degrees, etc. In such examples, imagery may be captured as to stress, which may include thermal stress (e.g., noting that a roller may be a heat source and/or a heat sink).

In the example equipment 1650, one or more sensors may be positioned to capture imagery of one side while one or more sensors may be positioned to capture imagery of an opposing side. As shown, one side may be coated first followed by coating of the opposing side. In such an example, drying units may be displaced along a production line such that heating occurs after coating one side followed by ambient cooling, optionally driven in part by speed of conveyance, where, once again heating occurs after coating of the opposing side, followed by ambient cooling. In such an example, two heating and cooling cycles are built-in, which can offer multiple points for capturing imagery.

As explained, imagery may be captured for a coated side and/or for an uncoated side. For example, consider capturing imagery of an uncoated side of a substrate where such imagery may be utilized to ascertain one or more quality control metrics.

As explained, a method can provide for controlling distribution of silicon in an electrode material. In operation, silicon and/or other materials may expand and contract responsive to heating, cooling, lithiation, de-lithiation, etc. As an example, a method can include tailoring an electrode (e.g., an anode) as to how it will expand/contraction as silicon lithiates and de-lithiates to make it handle cycling stresses to thereby increase longevity. For example, where silicon can be more uniformly distributed and/or distributed in a particularly beneficial way (e.g., pattern-wise, etc.) in a controllable manner, behavior of an electrode material may be improved or at least known with less certainty. As silicon is known to increase and decrease in volume during litiation and de-lithiation, which can result in various stresses, an ability to control how silicon is distributed in an electrode material can help to build-into an electrode material desirable stress behavior, which may help to increase performance of the electrode material (e.g., improved longevity, reduced fracturing, etc.). Where silicon is not distributed in a desirable manner, cycling stresses will be hard to know a priori and may lead to fractures in regions where silicon concentration is high (e.g., due to volume increase during lithiation).

As an example, a method can include modeling an electrode as to one or more physical phenomena, which may include one or more of heating, cooling, lithiation and de-lithiation. In such an example, an optimal pattern for the distribution of silicon may emerge. Such an optimal pattern may or may not be uniform. For example, consider a distribution where silicon concentration is less near a center and greater near a periphery where an ability to handle stresses may be greater near the periphery than at the center. In such an example, an electrode material may exhibit increased tolerance to volume increases and decreases in silicon responsive to lithiation and de-lithiation. As an example, a pattern may be relatively uniform within some limits such that regional performance of an electrode material is within some lower and upper limits.

As an example, an electrode material may be tailored to handle one or more sources of stress, which can include thermal and lithiation. As an example, an electrode material may be tailored using a multi-objective optimization whereby silicon is distributed in the electrode material in a manner that helps to improve integrity of the electrode material. For example, as a center of an electrode may have a more difficult time to dissipate heat and hence experience more thermal stress, an optimized approach can distribute silicon in a manner whereby, upon a lithiation induced volume increase of the silicon, the center of the electrode does not exceed some stress limit from a combination of thermal stress and silicon lithiation volume induced stress (e.g., at a specified temperature or temperatures). As edges of an electrode may be able to more readily dissipate heat and may be able to more freely expand (e.g., subject to some constraints), they may experience lesser thermal stress and may, for example, be able to accommodate more silicon lithiation volume induced stress.

As explained, different materials can exhibit different thermal behaviors, which may be due to heat capacity, thermal conductivity, and/or thermal expansion differences. As an example, a method that includes heating and/or cooling may provide for characterizing an electrode material, which may be as to distribution of a material and/or as to stress and/or strain from expansion and contraction during heating and/or cooling.

As an example, where a system provides for imagery capture, the system may be able to track relatively small movements, changes in size, stresses, etc., which may be on a micrometer or smaller scale (e.g., depending on underlying geometry, changes in temperature, etc.). In instances where expansion/contraction is not as expected (e.g., according to prior data, one or more models, etc.), there may be one or more underlying quality issues, which may relate to how one material is distributed with respect to one or more other materials (e.g., silicon in graphite, etc.). As an example, a system may provide for assessing distribution of silicon through thermal imagery and/or through imagery (e.g., thermal or other) that can measure expansion and/or contraction due to heating and/or cooling.

FIG. 17 shows some examples of techniques 1700 for electrode assessments. As shown, the techniques 1700 can provide for determining one or more of material distribution 1710, thermal stresses 1720, lithiation stresses 1730 and/or internal stresses 1740. As explained, relationships can exist for such factors. For example, the distribution of silicon can impact thermal stresses, lithiation stresses and internal stresses. As explained, material distribution 1710 may be determined using one or more methods, which can include chemistry-based methods and imaging-based methods. As to thermal stresses 1720, these may be determined using imagery, which may include thermal imagery, polariscope type of imagery and/or strain imagery (e.g., displacements, movements, etc.). As to lithiation stresses 1730, these may be determined using a model-based approach that accounts for distribution and/or based on experimental data (e.g., laboratory experiments). As to internal stresses 1740, these may be imparted to an electrode upon manufacture via one or more processing conditions, material conditions, etc. For example, evaporation of solvent from a slurry during a drying process can impart internal stresses as may one or more heating and/or cooling cycles. As to internal stresses 1740, these may be sensed using one or more techniques, which may include imaging techniques (e.g., polariscope type of imagery, strain imagery, etc.). As mentioned, one or more methods, techniques, systems, etc., may be applied to one or more of slurry and/or one or more of such alternative techniques. As an example, a process may utilize multiple techniques.

As explained, an anode electrode of a LIB can be improved by using silicon, which may be present in one or more forms. However, silicon can present issues due to maldistribution and/or lithiation volume increase. Where the distribution of silicon can be controlled and/or measured, an anode electrode can be manufactured in a manner that can better tolerate silicon, which may, for example, improve performance of the anode electrode and hence performance of a LIB. As explained, various factors that impact performance can relate to stress where, for example, lithiation volume increase of silicon can be a major factor. In an anode electrode, the impact of lithiation volume increase of silicon can be compounded by one or more other factors (e.g., internal stress, thermal stress, etc.). Hence, as explained, an anode electrode may be optimized where the distribution of silicon in the anode electrode can be controlled, which may be according to a desired uniform distribution and/or according to a desired pattern.

FIG. 18 shows some examples of devices 1800 that may be powered by a lithium-ion cell or cells (e.g., in the form of a lithium-ion battery or batteries). For example, a cell phone, a tablet, a camera, a GPS device, a notebook computer, or other device may be powered by a lithium-ion cell or cells. As to other devices, a device may be an electric motor of an electric vehicle or a hybrid vehicle. A device may be an automobile, a toy, a remote control device (e.g., a bomb sniffers, drones, etc.), etc. A device may include one or more processors 1802, memory 1804, one or more network interfaces 1806, one or more displays 1808 and, as a power source, one or more lithium-ion cells 1810.

As an example, a device 1820 may include a power cell(s) 1821, circuitry 1822 and, for example, a display 1828. In such an example, the thickness of the device 1820 may be determined largely by a thickness of the power cell(s) 1821. For example, about 80 percent of the overall thickness of the device 1820 may be determined by a thickness of the power cell(s) 1821.

FIG. 18 also shows an example of a vehicle 1830 that includes an engine control unit (ECU) 1832, a cell pack 1840 and an electric motor and generator 1835 and an example of a system 1850 for the vehicle 1830 that includes the ECU 1832, the cell pack 1840, the electric motor and generator 1835 and charge control circuitry 1833 (e.g., which may be part of the ECU 1832). The vehicle 1830 may include, for example, one or more processors, memory, etc.

As an example, the vehicle 1830 may be a hybrid electric vehicle (HEV) where the cell pack 1840 may, for example, be used to absorb braking energy for immediate re-use in an acceleration cycle (e.g., using the electric motor and generator 1835 as a generator in a regenerative braking scheme). As an example, the vehicle 1830 may be a plug-in hybrid electric vehicle (PHEV) where the cell pack 1840 is rated at about 5.2 kWh to 16 kWh or more, for example, to offer both hybrid and electric drive functions. As an example, the vehicle 1830 may be a battery electric vehicle (BEV) where the cell pack 1840 is rated at about 24 kWh to 200 kWh or more to propel the vehicle 1830.

As an example, a method can include providing a first pre-mix that includes a first population of solid particles of a first material for lithiation in an electrode of a lithium-ion cell and a second population of solid particles for a second material for lithiation in the electrode of the lithium-ion cell; providing a second pre-mix that includes a population of solid particles of the first material for lithiation in the electrode of the lithium-ion cell; forming the electrode by coating a substrate using the first pre-mix and the second pre-mix to form a coated substrate with a desired distribution of the second material in the electrode; and forming the lithium-ion cell using the electrode. In such an example, the first material can be or include graphite and, for example, the second material can be or include silicon, which may be in one or more forms (e.g., silicon metal, silicon oxide, etc.).

As an example, a second material may include a heavy metal. For example, consider a heavy metal that is or that includes cobalt.

As an example, a mixture can include a solids mass of a first pre-mix and a solids mass of a second pre-mix, where the solids mass of the first pre-mix is less than the solids mass of the second pre-mix. As an example, a first pre-mix can have a solids mass of a first material that is within +/−20 percent of a solids mass of a second material. As an example, a first pre-mix can have a solids mass of a first material that is within +/−10 percent of a solids mass of a second material.

As an example, a method can include forming a first pre-mix and forming a second pre-mix. In such an example, forming the first pre-mix can include mixing at a first mixing speed and forming the second pre-mix can include mixing at a second mixing speed, where the first mixing speed is less than the second mixing speed. In such an example, the method can include forming the mixture using a mixing speed that is less than the second mixing speed.

As an example, a first pre-mix and a second pre-mix can include binder, for example, consider polyvinyldifluoride. As an example, a first pre-mix and a second pre-mix can include solvent. As an example, a first pre-mix and a second pre-mix can include at least one type of conductive carbon additive.

As an example, a lithium-ion battery can include an anode electrode formed from coating a substrate using a mixture of a first pre-mix that includes a first population of solid particles of a first material for lithiation in the anode electrode and a second population of solid particles for a second material for lithiation in the anode electrode and a second pre-mix that includes a population of solid particles of the first material for lithiation in the anode electrode to provide a desired distribution of the second material in the anode electrode; a cathode electrode; and a lithium-ion conductive separator disposed between the anode electrode and the cathode electrode. In such an example, the first material can be or include graphite and the second material can be or can include silicon. As an example, a desired distribution can be or can include a desired patterned distribution. For example, a desired distribution can be or can include a desired patterned distribution of silicon with respect to graphite.

As an example, a method can include sensing one or more materials of a graphite-based anode electrode for a lithium-ion battery that incudes silicon; and characterizing the silicon content in the graphite-based anode electrode.

As an example, sensing can include dissolving a portion of a graphite-based anode electrode in a solvent. In such an example, sensing can include sonicating the portion of the graphite-based anode electrode in the solvent and/or otherwise generating a specimen and analyzing the specimen using analytical equipment. As an example, a solvent may be or may include one or more of water and NMP.

As an example, sensing can include removing a coated protective film from a coated strip of electrode material for a graphite-based anode electrode. In such an example, sensing can include dissolving a portion of the coated protected film in a solvent to generate a specimen and analyzing the specimen using analytical equipment.

As an example, sensing can include capturing imagery of electrode material for a graphite-based anode electrode. In such an example, imagery can be or can include infrared imagery. As an example, sensing can include one or more of heating and cooling the electrode material.

As an example, characterizing silicon content can include analyzing imagery for a distribution of silicon with respect to graphite. As an example, characterizing silicon content can include determining a distribution of silicon with respect to the graphite (e.g., using one or more of imagery, extracted samples, etc.).

As an example, sensing can include sensing thermal stress in at least an electrode material of a graphite-based anode electrode. For example, consider sensing thermal stress that is indicative of a distribution of silicon in graphite of a graphite-based anode electrode.

As an example, a quality assessment system can include an infrared camera for capturing imagery of electrode material for an electrode of a lithium-ion battery; a heat source; and a controller that controls the heat source and the infrared camera and that processes the imagery to characterize distribution of a material in the electrode material. In such an example, the material can be or can include silicon.

As an example, a controller can instruct a heat source to heat an electrode material and to capture imagery during heating of the electrode material and/or a controller can instruct a heat sink (e.g., a cooler, etc.) to cool an electrode material and to capture imagery during cooling of the electrode material.

As an example, a controller may characterize a distribution of material by identifying presence of instances of the material in imagery captured by one or more sensors (e.g., one or more cameras, etc.).

As an example, a quality assessment system can include a controller that generates output for process equipment. In such an example, the output may include output that can instruct the process equipment to adjust at least one process parameter related to dispersal of the material with respect to a conveyed substrate. For example, where a desired distribution of a material is to be achieved for electrode material, a quality assessment system can generate output related to actual distribution of the material in the electrode material where process equipment can adjust one or more process parameters in an effort to achieve the desired distribution of the material in the electrode material.

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A method comprising:
providing a first pre-mix that comprises a first population of solid particles of a first material for lithiation in an electrode of a lithium-ion cell and a second population of solid particles for a second material for lithiation in the electrode of the lithium-ion cell;
providing a second pre-mix that comprises a population of solid particles of the first material for lithiation in the electrode of the lithium-ion cell;
forming the electrode by coating a substrate using the first pre-mix and the second pre-mix to form a coated substrate with a desired distribution of the second material in the electrode; and
forming the lithium-ion cell using the electrode.

2. The method of claim 1, wherein the first material comprises graphite.

3. The method of claim 2, wherein the second material comprises silicon.

4. The method of claim 3, wherein the second material comprises silicon oxide.

5. The method of claim 2, wherein the second material comprises a heavy metal.

6. The method of claim 5, wherein the heavy metal comprises cobalt.

7. The method of claim 1, wherein the mixture comprises a solids mass of the first pre-mix and a solids mass of the second pre-mix, wherein the solids mass of the first pre-mix is less than the solids mass of the second pre-mix.

8. The method of claim 1, wherein the first pre-mix comprises a solids mass of the first material that is within +/−20 percent of a solids mass of the second material.

9. The method of claim 1, wherein the first pre-mix comprises a solids mass of the first material that is within +/−10 percent of a solids mass of the second material.

10. The method of claim 1, comprising forming the first pre-mix and forming the second pre-mix.

11. The method of claim 10, wherein forming the first pre-mix comprises mixing at a first mixing speed and wherein forming the second pre-mix comprises mixing at a second mixing speed, wherein the first mixing speed is less than the second mixing speed.

12. The method of claim 11, comprising forming the mixture using a mixing speed that is less than the second mixing speed.

13. The method of claim 1, wherein the first pre-mix and the second pre-mix comprise binder.

14. The method of claim 13, wherein the binder comprises polyvinyldifluoride.

15. The method of claim 13, wherein the first pre-mix and the second pre-mix comprise solvent.

16. The method of claim 13, wherein the first pre-mix and the second pre-mix comprise at least one type of conductive carbon additive.

17. The method of claim 1, wherein the forming the electrode comprises testing at least a portion of the coated substrate to determine a distribution of the second material in the electrode, and comprising performing an assessment of the distribution with respect to the desired distribution, and, responsive to an undesirable assessment, adjusting one or more of the first pre-mix and the second pre-mix.

18. A method comprising:
   forming a mixture using pre-mixes, wherein the mixture comprises graphite and a silicon material;
   coating a portion of a substrate using the mixture to form a coated portion of the substrate for an anode of a lithium-ion cell;
   testing the coated portion of the substrate to determine a distribution pattern of the silicon material;
   performing an assessment of the distribution pattern with respect to a desired distribution pattern; and
   responsive to an undesirable assessment, adjusting the mixture and coating another portion of the substrate.

19. The method of claim 18, wherein the testing comprises non-destructive testing using imagery.

20. The method of claim 18, wherein the testing comprises heating or cooling the coated portion of the substrate to detect thermal phenomena indicative of the distribution pattern of the silicon material.

* * * * *